(12) United States Patent
Leitner

(10) Patent No.: US 7,258,386 B2
(45) Date of Patent: Aug. 21, 2007

(54) FUEL DOOR ASSEMBLY

(75) Inventor: Horst Leitner, Laguna Beach, CA (US)

(73) Assignee: 89908, Inc., Irvine, CA (US)

( * ) Notice: Subject to any disclaimer, the term of this patent is extended or adjusted under 35 U.S.C. 154(b) by 0 days.

(21) Appl. No.: 11/392,224

(22) Filed: Mar. 28, 2006

(65) Prior Publication Data

US 2006/0284440 A1 Dec. 21, 2006

Related U.S. Application Data

(63) Continuation-in-part of application No. 11/064,032, filed on Feb. 22, 2005, now abandoned, which is a continuation of application No. 10/420,101, filed on Apr. 18, 2003, now abandoned, which is a continuation of application No. 10/090,464, filed on Mar. 4, 2002, now abandoned, which is a continuation of application No. 09/556,374, filed on Apr. 24, 2000, now Pat. No. 6,352,295.

(60) Provisional application No. 60/131,259, filed on Apr. 27, 1999.

(51) Int. Cl.
B60K 15/05 (2006.01)
E05F 1/14 (2006.01)

(52) U.S. Cl. ............................ 296/97.22; 16/286

(58) Field of Classification Search ............ 296/97.22, 296/146.11; 16/227, 255, 260, 277, 286, 16/289, 291, 292, 293, 296, 303, 321; 220/86.2; 280/834

See application file for complete search history.

(56) References Cited

U.S. PATENT DOCUMENTS

| 540,707 | A | 6/1895 | Wolf |
| 1,031,283 | A | 7/1912 | Mullineux |
| 1,214,600 | A | 2/1917 | Silverthorne |
| 1,930,841 | A | 10/1933 | Miniere |
| 2,067,994 | A | 1/1937 | Thwaits |
| 2,105,071 | A * | 1/1938 | Bowers .................. 49/386 |
| 2,483,947 | A | 10/1949 | Turner |
| 2,663,447 | A | 12/1953 | Westcott |
| 2,702,651 | A * | 2/1955 | Graham .................. 220/827 |
| 3,212,124 | A | 10/1965 | MacDonald |

(Continued)

FOREIGN PATENT DOCUMENTS

WO WO97/43511 11/1997

OTHER PUBLICATIONS

Photographs of Fuel Door Specimen for Mitsubishi Eclipse Being Used Prior to Applicant's Invention of Claimed Fuel Door (Nos. 1-5).

Primary Examiner—D. Glenn Dayoan
Assistant Examiner—Paul Chenevert
(74) Attorney, Agent, or Firm—Knobbe, Martens, Olson & Bear LLP

(57) ABSTRACT

There is described an improved fuel door assembly. In one preferred embodiment, the fuel door comprises a housing that defines an axis of rotation and has a biasing element that is at least partially surrounded by a second interface that forms a cavity that narrows between the ends of the second interface. The fuel door has a first interface that contacts the second interface such that the biasing element urges the fuel door toward the closed position when the fuel door is at the closed position, and urges the fuel door toward the open position when the fuel door is at the open position.

10 Claims, 23 Drawing Sheets

U.S. PATENT DOCUMENTS

| | | | |
|---|---|---|---|
| 3,255,484 A * | 6/1966 | MacDonald | 16/278 |
| 3,577,840 A * | 5/1971 | Buberniak | 16/332 |
| 3,629,899 A * | 12/1971 | Deadrick | 16/332 |
| 3,715,778 A * | 2/1973 | Wilson | 16/278 |
| 3,722,030 A * | 3/1973 | Smith | 16/303 |
| 4,592,529 A | 6/1986 | Suzuki | |
| 4,884,317 A | 12/1989 | Liu | |
| 5,234,122 A | 8/1993 | Cherng | |
| 5,357,376 A | 10/1994 | Yoshida | |
| 5,417,340 A | 5/1995 | Anthony | |
| 5,500,983 A | 3/1996 | Lautenschlager | |
| 5,673,958 A | 10/1997 | Gramss | |
| 5,772,062 A | 6/1998 | Gramss | |
| 6,092,263 A | 7/2000 | Boue et al. | |
| 6,352,295 B1 | 3/2002 | Leitner | |
| 6,752,448 B1 | 6/2004 | Hsu | |
| 6,766,561 B1 * | 7/2004 | Cheng | 16/235 |
| 2002/0130531 A1 | 9/2002 | Leitner | |
| 2003/0098304 A1* | 5/2003 | Foltz | 220/86.2 |
| 2003/0200700 A1 | 10/2003 | Leitner | |
| 2005/0146157 A1* | 7/2005 | Leitner | 296/97.22 |

* cited by examiner

FUEL DOOR ASSEMBLY

RELATED APPLICATIONS

This application is a continuation-in-part application of U.S. application Ser. No. 11/064,032, filed Feb. 22, 2005, now abandoned which is a continuation application of U.S. application Ser. No. 10/420,101, filed Apr. 18, 2003, now abandoned which is a continuation application of U.S. application Ser. No. 10/090,464, filed Mar. 4, 2002, now abandoned which is a continuation application of U.S. application Ser. No. 09/556,374, filed Apr. 24, 2000, now U.S. Pat. No. 6,352,295, which claims priority from U.S. Provisional Application No. 60/131,259, filed Apr. 27, 1999, titled FUEL DOOR ASSEMBLY. The disclosures all of which are incorporated by reference.

BACKGROUND OF THE INVENTION

1. Field of the Invention

The present invention relates generally to fuel door systems, and more particularly to a fuel door assembly for a motor vehicle or other equipment fueled by gasoline or other fuels or energy sources.

2. Description of the Related Art

Many vehicles utilize a fuel door assembly including a fuel door which covers an opening in the body of the vehicle to provide a somatically appealing cover over the fuel cap. Typically, the fuel door assembly will include a housing, a fuel door and a closing mechanism. The closing mechanism keeps the fuel door closed when the vehicle is not being fueled to minimize any negative impact on the appearance of the vehicle due to the fuel door. Unfortunately, such assemblies are often relatively expensive to manufacture, include numerous parts, are difficult and time consuming to assemble, are subject to malfunction due to corrosion, and do not have a compact, low profile design.

SUMMARY

One aspect of the present invention is an improved fuel door assembly. The assembly desirably includes a housing, a fuel door and a closing mechanism. Advantageously, certain embodiments of the assembly may be particularly adapted to be inexpensively manufactured out of a minimum number of parts, to be quickly and easily assembled, to be less subject to malfunction due to corrosion of the biasing element or mechanism, and to include a low-profile design that is more compact.

In accordance with one preferred embodiment, a fuel door assembly comprises a housing having a first support portion and a second portion such that a first end of a biasing element is mounted into the first support portion and a second end of the biasing element is mounted into the second support portion, and a fuel door received in the housing and rotatable about the axis of rotation between a closed position and an open position. The fuel door further comprises a first interface. The biasing element is adapted to bias the first interface in a first direction to move the fuel door towards a closed position. The biasing element is further adapted to bias the first interface in a second direction to move the fuel door towards an opened position. In one embodiment, the fuel door assembly further comprises a second interface that at least partially surrounds the biasing element between the first and second ends of the biasing element.

In accordance with yet another preferred embodiment, a fuel door assembly comprises a biasing element defining a longitudinal axis having a first end mounted to a first support portion and a second end mounted to a second support portion, and a fuel door having a first hinge portion that defines an axis of rotation aligned with the longitudinal axis of the biasing element. The fuel door further comprises a first interface. The biasing element is adapted to engage the first interface to bias the fuel door toward a closed position and to bias the fuel door toward an opened position. In one embodiment, the longitudinal axis of the biasing element is substantially parallel to the axis of rotation. In one embodiment, a second interface at least partially surrounds the biasing element between the first and second ends of the biasing element. In one embodiment, the second interface defines a cavity that enables the biasing element to flex transversely to the longitudinal axis. In one embodiment, the cavity of the second interface narrows between the ends of the second interface. In one embodiment, the biasing element comprises a substantially resilient material such as plastic or metal or the like. In one embodiment, at least a portion of the second interface defines a substantially cylindrical outer surface or tube. In one embodiment, the second interface comprises a flexible material. In one embodiment, the second interface comprises a substantially rigid material.

In accordance with still another preferred embodiment, a fuel door assembly comprises a biasing element that urges a fuel door towards the closed position when the fuel door is ten to fifteen degrees from the fully closed position. In accordance with yet another preferred embodiment, a fuel door assembly comprises a biasing element that urges a fuel door towards the opened position when the fuel door is fifteen to twenty degrees from the fully opened position. In accordance with yet another preferred embodiment, a fuel door assembly comprises a biasing element that neither urges the fuel door towards the opened position nor the closed position when the fuel door is a neutral position between the fully opened and fully closed positions.

Another aspect of the present invention is an improved fuel door assembly. The assembly includes a housing, a fuel door and a closing mechanism. Advantageously, the assembly is particularly adapted to be inexpensively manufactured out of a minimum of parts, and to be quickly and easily assembled.

In accordance with one preferred embodiment a fuel door assembly comprises a housing that defines an axis of rotation and has a moveable retaining surface that is biased toward the axis of rotation, and a fuel door received in the housing and rotatable about the axis of rotation between a closed position and an open position. The fuel door has a first cam surface and a second cam surface. The retaining surface contacts the first cam surface and urges the fuel door toward the closed position when the fuel door is at the closed position, and contacts the second cam surface and urges the fuel door toward the open position when the fuel door is at the open position.

In accordance with another preferred embodiment a fuel door assembly comprises a housing that has first and second hinge bearings, each of which has an inward-facing open end. The hinge bearings are axially aligned so as to define an axis of rotation. The housing also has a moveable retaining surface that faces the open ends of the first and second hinge bearings and is biased toward the axis of rotation. The fuel door assembly also has a fuel door with a lever portion and first and second axle portions. The fuel door is received in the housing such that the first and second axle portions are journaled to the first and second hinge bearings, the fuel door thus being rotatable about the axis of rotation between a closed position and an open position. The retaining surface retains the fuel door in the housing by contacting and applying a biasing force to the lever portion so as to urge the first and second axle portions against the first and second hinge bearings.

In accordance with yet another preferred embodiment a method of assembling a fuel door to a housing comprises installing first and second axle portions of the fuel door in first and second hinge bearings of the housing, and permitting an outwardly-biased retaining surface of the housing to contact a lever portion of the fuel door and thereby urge and retain the first and second axle portions in the first and second hinge bearings.

In accordance with still another preferred embodiment a fuel door assembly comprises a housing that defines an axis of rotation and has a moveable retaining surface that is biased toward the axis of rotation. A fuel door is received in the housing and is rotatable about the axis of rotation between a closed position and an open position. The fuel door has a first cam surface and a second cam surface. The retaining surface contacts one of the first cam surface and the second cam surface to maintain the angular position of the fuel door when the fuel door in either the open position or the closed position.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWING

Having thus summarized the general nature of the invention and its essential features and advantages, certain preferred embodiments and modifications thereof will become apparent to those skilled in the art from the detailed description herein having reference to the figures that follow, of which.

DETAILED DESCRIPTION

EMBODIMENT OF FIGS. 1-9

Figure 1:
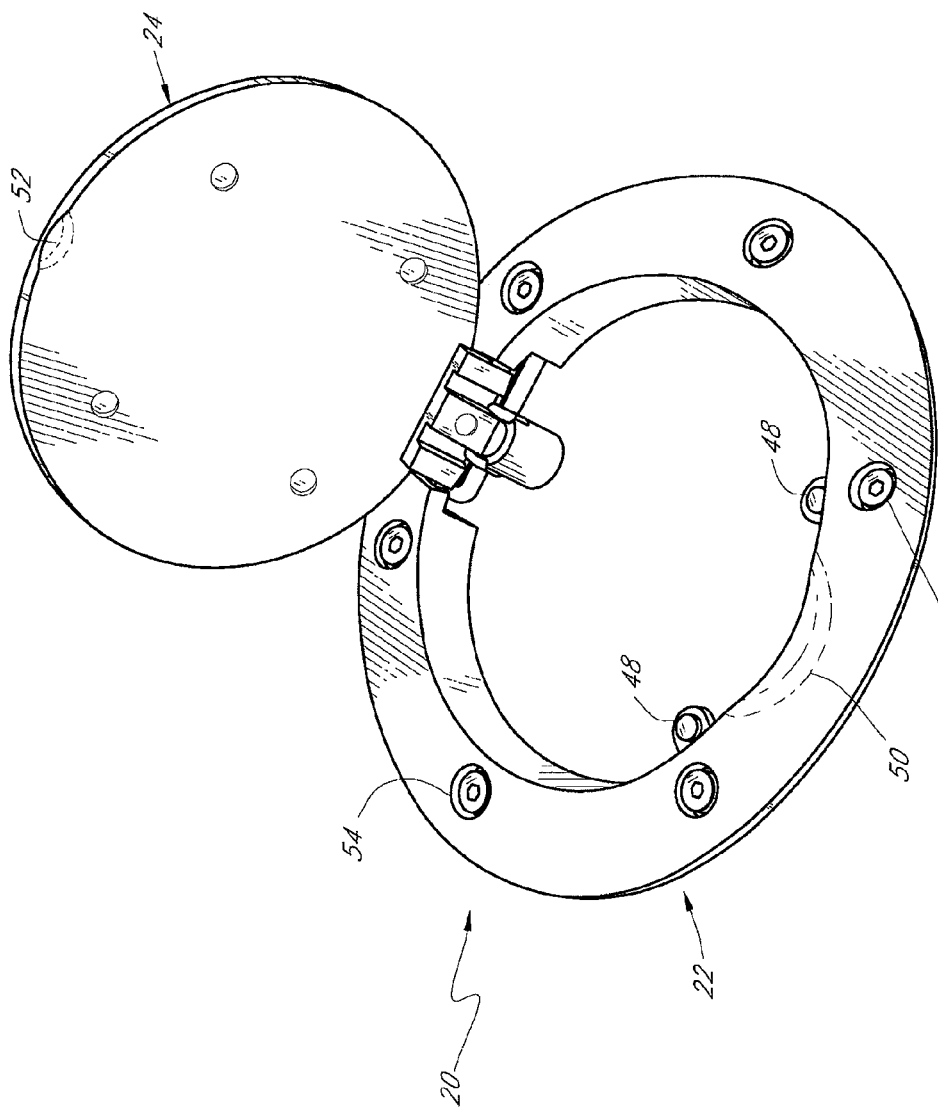
FIG. 1 is a perspective view of a fuel door assembly having features in accordance with one preferred embodiment of the invention, shown with the fuel door in the open position.
Figure 2:
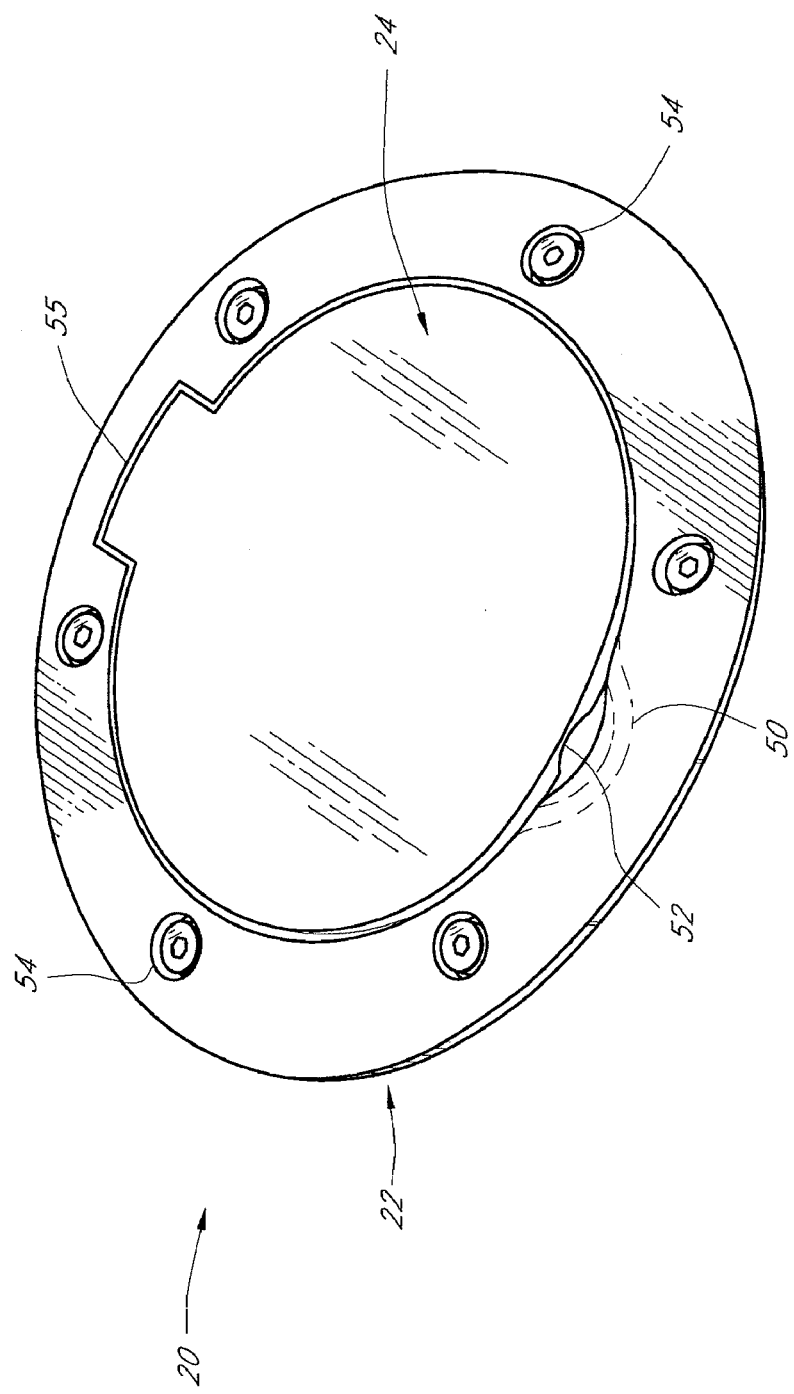
FIG. 2 is a perspective view of the fuel door assembly of FIG. 1, shown with the fuel door in the closed position.

Below is a detailed description of the embodiment described in FIGS. 1-9

FIGS. 1-5 depict a fuel door assembly 20 having features in accordance with one preferred embodiment of the invention. The fuel door assembly 20 generally comprises a housing 22 that receives a fuel door 24, which is rotatable through about 80°-100° between a closed position A in which the fuel door is generally flush with the housing (see FIG. 3) and an open position B in which the fuel door permits the entry of a nozzle through an opening in the housing (see FIG. 4). Preferably, the angle between the open position and the closed position is about 90°.

The fuel door 24 and the housing 22 are shown in greater detail in FIGS. 5, 6 and 7A-7C. The fuel door 24 has a cover portion 26, a lever portion 28 and axle portions 30a, 30b. The lever portion 28 forms a first cam surface or leverage surface 32a and a second cam surface or leverage surface 32b. A peak surface 34, which is preferably curved, is disposed between the first and second cam surfaces 32a, 32b. To minimize cost and difficulty of assembly, the fuel door 24 is preferably formed or molded as an integral unit; however one skilled in the art will appreciate that any of the cover portion 26, lever portion 28 and axle portions 30a, 30b may be separately fabricated and attached to the remainder of the fuel door 24 via conventional techniques.

Figure 7A:
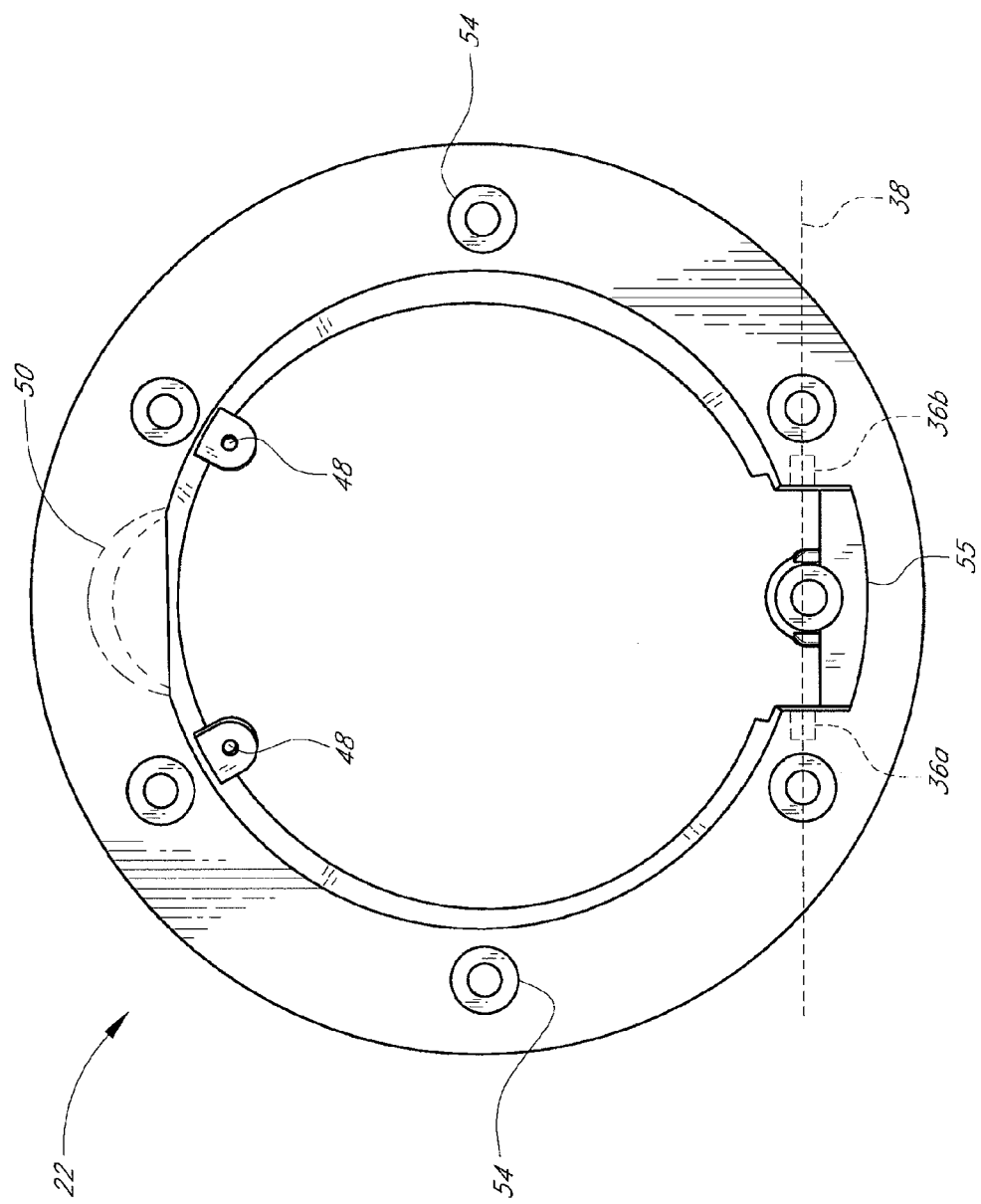
FIG. 7A-7C are plan, front perspective, and rear perspective views of a housing of the fuel door assembly shown in FIG. 1.
Figure 7B:
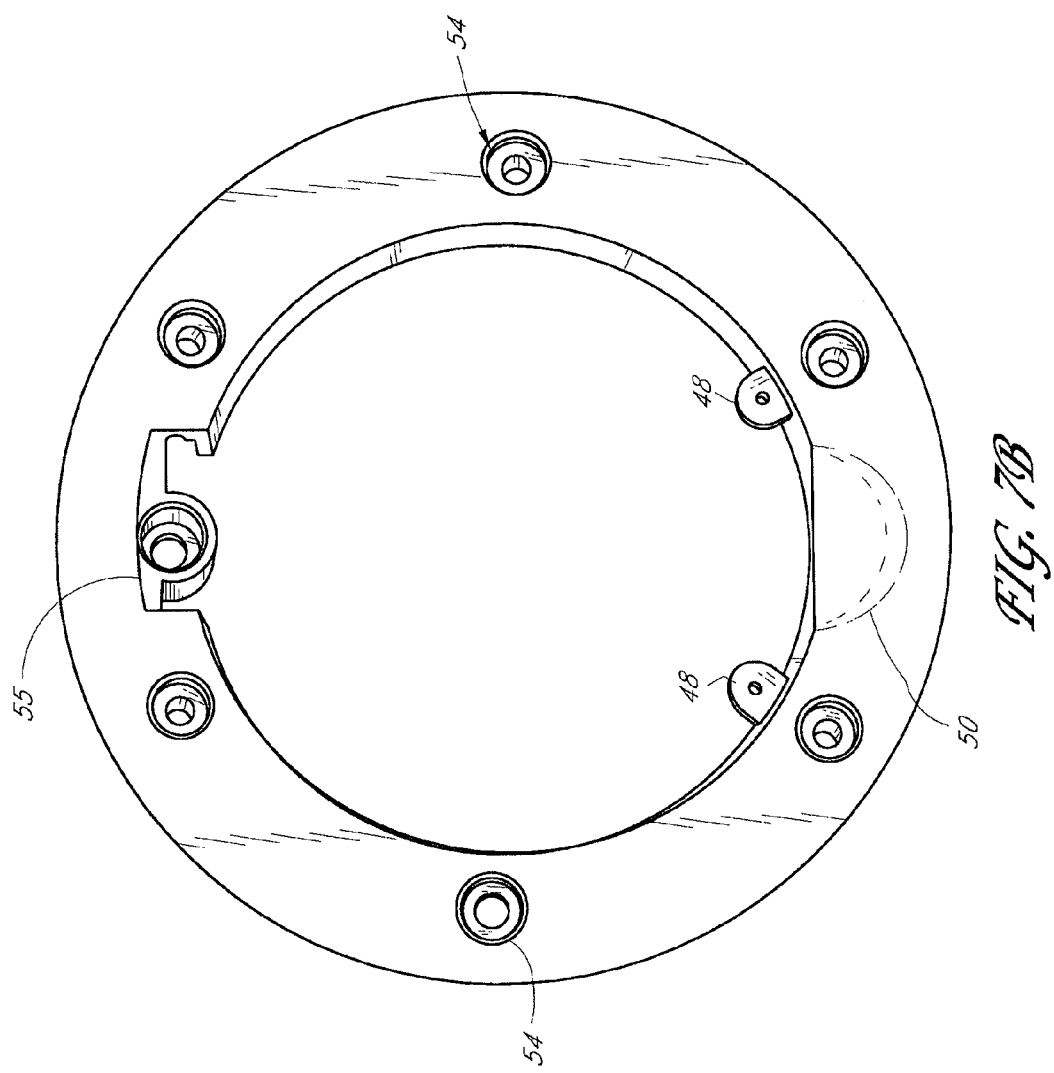
Figure 7C:
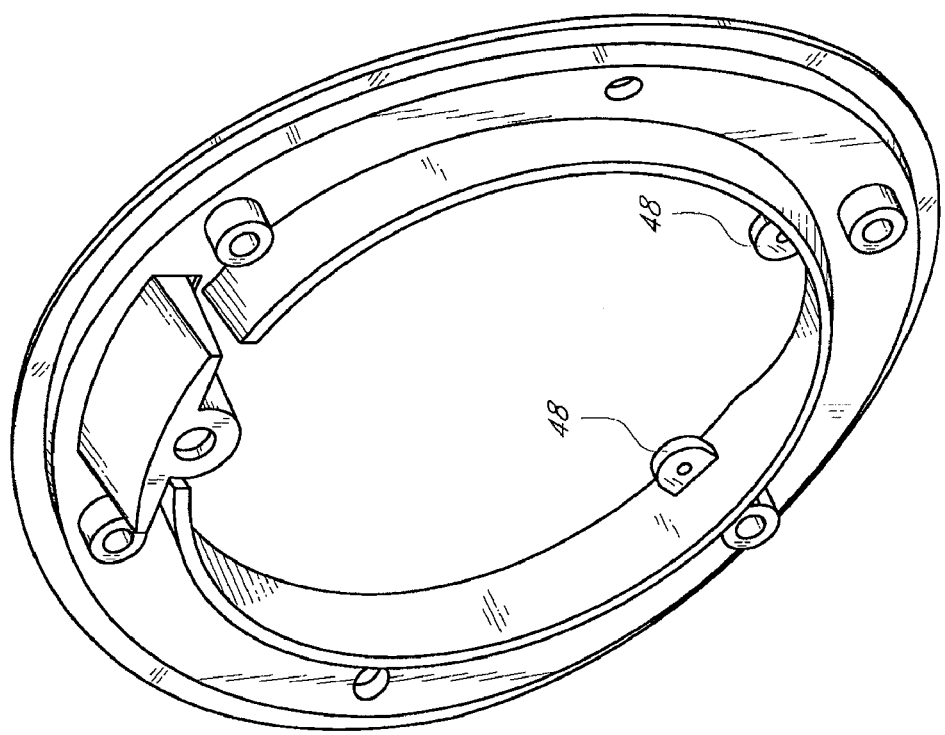

Referring specifically to FIG. 7A, the housing 22 preferably forms a first hinge bearing surface 36a and a second hinge bearing surface 36b that are axially aligned so as to define an axis of rotation 38. In the assembled unit (see FIGS. 3, 4) the hinge bearings 36a, 36b receive the axle portions 30a, 30b to permit the fuel door 24 to rotate about the axis of rotation 38. Although this is the preferred configuration, alternative possibilities exist for rotatably connecting the fuel door 24 to the housing 22, such as a single, extended-width hinge bearing that cooperates with a matching single, extended-width axle formed by the fuel door 24.

Figure 5:
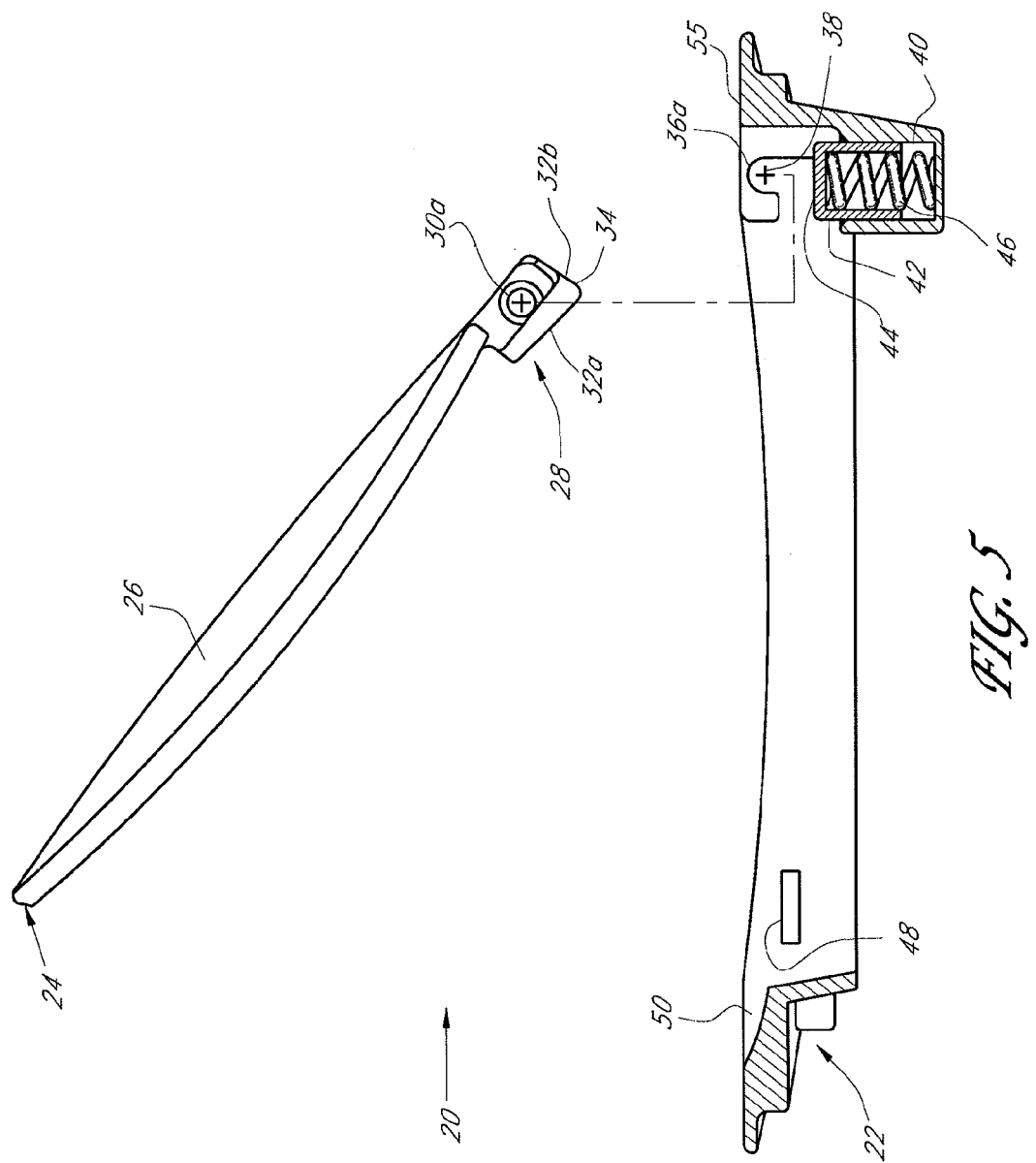
FIG. 5 is an exploded partial sectional view of the fuel door assembly of FIG. 1.
Figure 6:
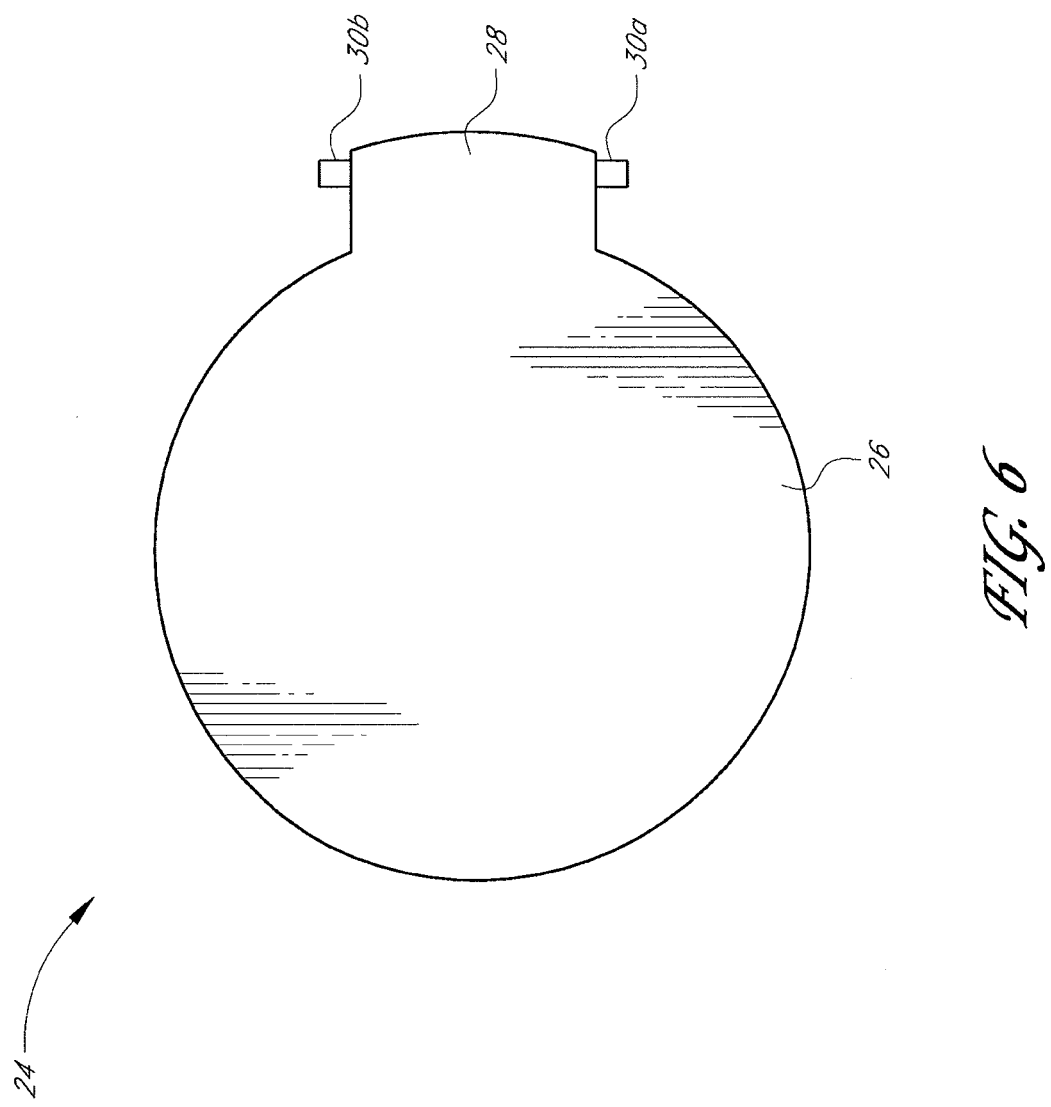
FIG. 6 is a plan view of a fuel door portion of the fuel door assembly shown in FIG. 1.

As best seen in FIG. 5, the hinge bearings 36a, 36b each have an open end that faces inward, i.e. away from the outer side of the housing 22. Inward of the hinge bearings 36a, 36b the housing 22 preferably forms a plunger socket 40 with an outward-facing open end that also faces the inward-facing open ends of the hinge bearings 36a, 36b. The open end of the plunger socket 40 receives a plunger 42 that is moveable linearly in and out of the socket 40. The plunger 42 forms a retaining surface 44 at its outer end surface and has a generally cylindrical inner surface which receives and retains a biasing spring 46. The biasing spring is thus positioned between the bottom of the socket 40 and the top of the plunger 42. The biasing spring 46 biases the plunger 42 and retaining surface 44 in the outward direction, toward the axis of rotation 38. The plunger socket 40, plunger 42 and biasing spring 46 comprise a preferred structure for providing a moveable retaining surface 44 that is biased toward the axis of rotation 38. However, it will be apparent to those skilled in the art that alternative structure may be used, such as an arched or leaf spring with a peak or apex that either serves as the retaining surface 44 or underlies the retaining surface 44, or a V-shaped or angled spring that can likewise serve as the biasing spring only, or both the biasing spring and the retaining surface. Furthermore, the biasing spring 46 and the plunger 42 can comprise a single integrated part. Finally, it is to be appreciated that the housing 22 can be formed as an integral part of motor vehicle/power equipment exterior panel or fueling pipe.

With reference to FIGS. 1, 3-5, and 7A-7C, the housing 22 preferably also comprises one or more alignment pads 48 against which the fuel door 24 rests when in the closed position, and a housing cutout 50 that cooperates with a door cutout 52 in the door 24 to facilitate easy grasping of the distal end of the door 24 when in the closed position. A number of openings 54 may also be provided to allow attachment of the fuel door assembly 20 to a motor vehicle or other equipment, with screws or other fasteners known to those skilled in the art. The housing 22 preferably also forms a mechanical stop 55 to limit the range of travel of the fuel door 24 and more precisely define the open position B.

Figure 3:
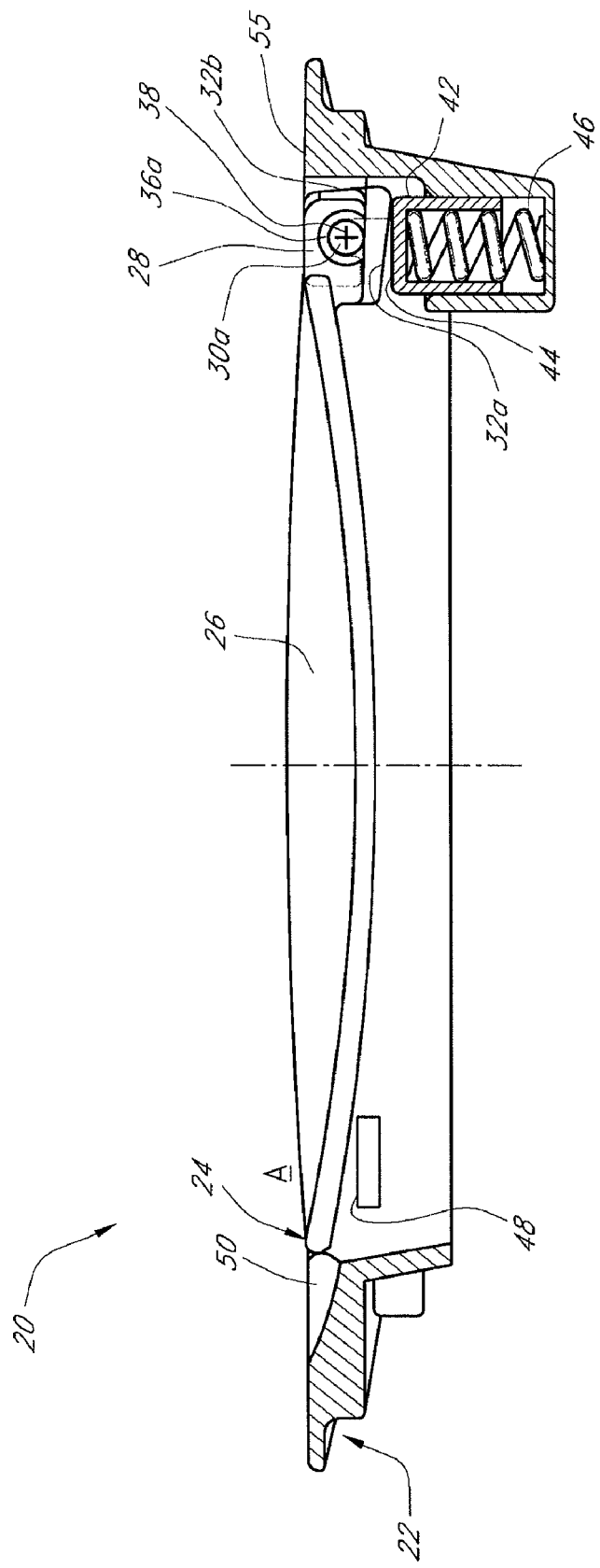
FIG. 3 is a partial sectional view of the fuel door assembly of FIG. 1, shown with the fuel door in the closed position.
Figure 4:
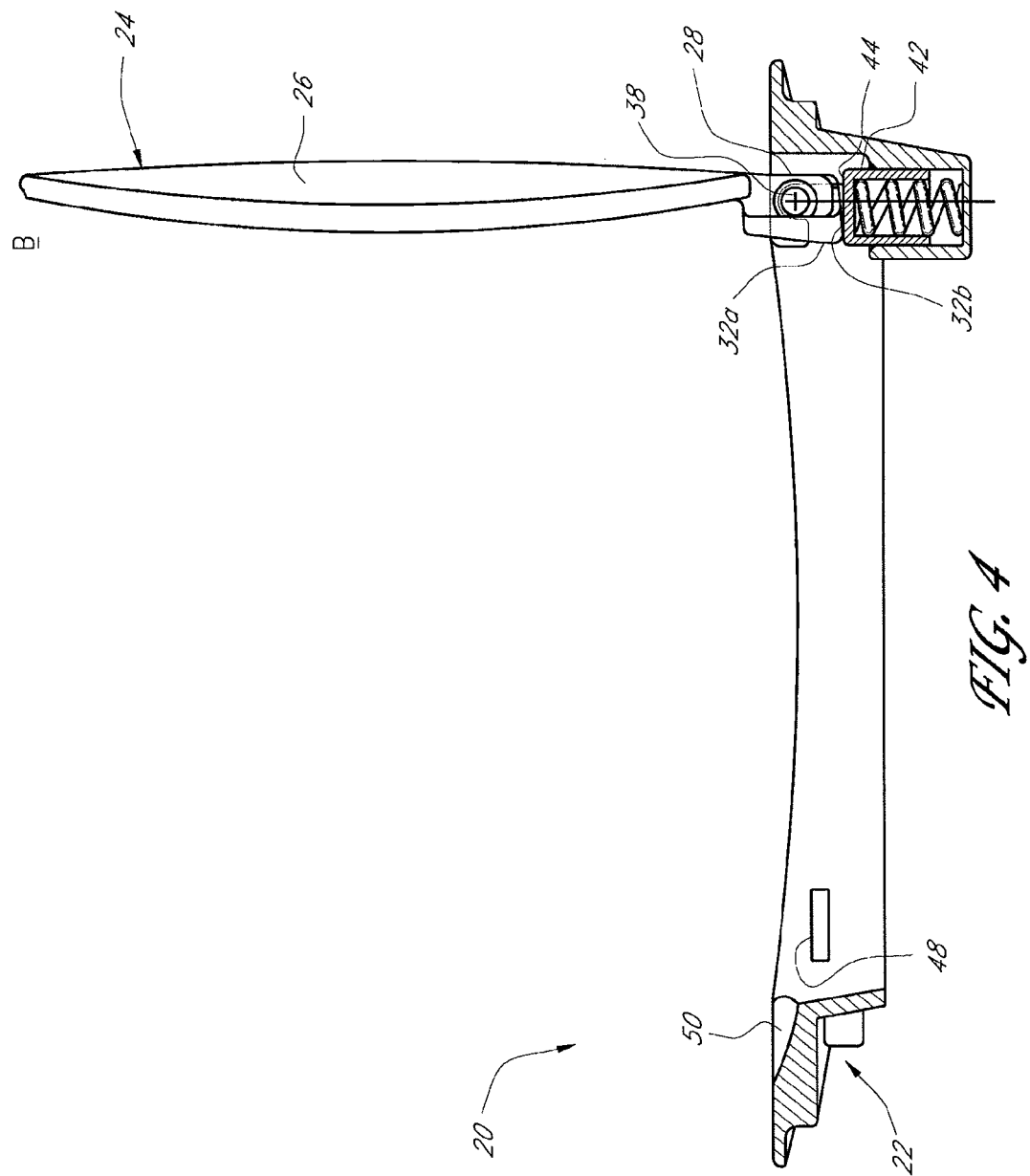
FIG. 4 is a partial sectional view of the fuel door assembly of FIG. 1, shown with the fuel door in the open position.

FIGS. 3 and 4 show the assembled fuel door assembly 20 in detail. When the fuel door 24 is in either the closed position A or the open position B, the retaining surface 44 bears against the lever portion 28 of the fuel door 24 (at either the first cam surface 32a or second cam surface 32b), under the urging of the biasing spring 46. The retaining surface 44 thus retains the fuel door 24 in assembled relation to the housing 22 by urging the first and second axle portions 30a, 30b of the fuel door 24 against the first and second hinge bearings 36a, 36b of the housing 22 and retaining the axle portions therein. In this manner the first and second axle portions 30a, 30b are journaled to the first and second hinge bearings 36a, 36b and the fuel door 24 is fixed to the housing 22 but nonetheless rotatable about the axis of rotation 38.

This arrangement of the retaining surface 44, lever portion 28, axle portions 30a, 30b and hinge bearings 36a, 36b provides many advantages in the construction of the fuel door assembly 20. No tools, fasteners or special skills are needed to assemble the fuel door 24 to the housing 22, which reduces the labor expense incurred in producing the fuel door assembly 22. The preferred assembly 20 contains at most four parts and is thus sturdy, lightweight, reliable, and no more complex than needed. The assembly process is speeded (and labor expenses reduced) when there are fewer parts that need to be put together, and the logistical "tail" leading to the assembly workstation is greatly simplified when fewer parts need to be supplied, tracked and accounted for.

At the closed position A shown in FIG. 3, the retaining surface 44 contacts and bears against the first cam surface 32a, preferably at a point or region of the cam surface located on a side of the axis of rotation 38 opposite the cover portion 26 of the fuel door 24. Thus when the fuel door 24 is at or near the closed position A, the retaining surface 44 urges the fuel door 24 toward the closed position. Similarly, when the fuel door 24 is at or near the open position B as seen in FIG. 4, the retaining surface 44 contacts and bears against the second cam surface 32b, preferably at a point or region located on a side of the axis of rotation 38 opposite the cover portion 26 of the fuel door 24. Thus when the fuel door 24 is at or near the open position B, the retaining surface 44 urges the fuel door 24 toward the open position. In this manner a "closed-bias" or "open-bias" force is constantly applied to the fuel door 24 at the closed position A and the open position B, respectively, as the retaining surface 44 and the cam surfaces 32a, 32b coact to hold the fuel door closed or open at either position.

This provision of a closed-bias/open-bias force in the closed and/or open positions A, B is advantageous for several reasons. When closed, the fuel door 24 is less likely to fall open except when the user deliberately grasps it and pulls it open. Thus, the fuel door 24 will not open "by itself" or clatter against the housing 22 when encountering vibration and/or aerodynamic forces when the vehicle (or other equipment) is underway. When open, the fuel door 24 is firmly retained at the (precisely defined) open position B and the fuel door assembly 20 thus conveys to the user the "feel" of a precision-crafted product, which is especially important to owners or potential purchasers of high performance or luxury automobiles. The precision of the open position B can be further enhanced by the inclusion in the housing of the mechanical stop 55 mentioned above.

Figure 8:
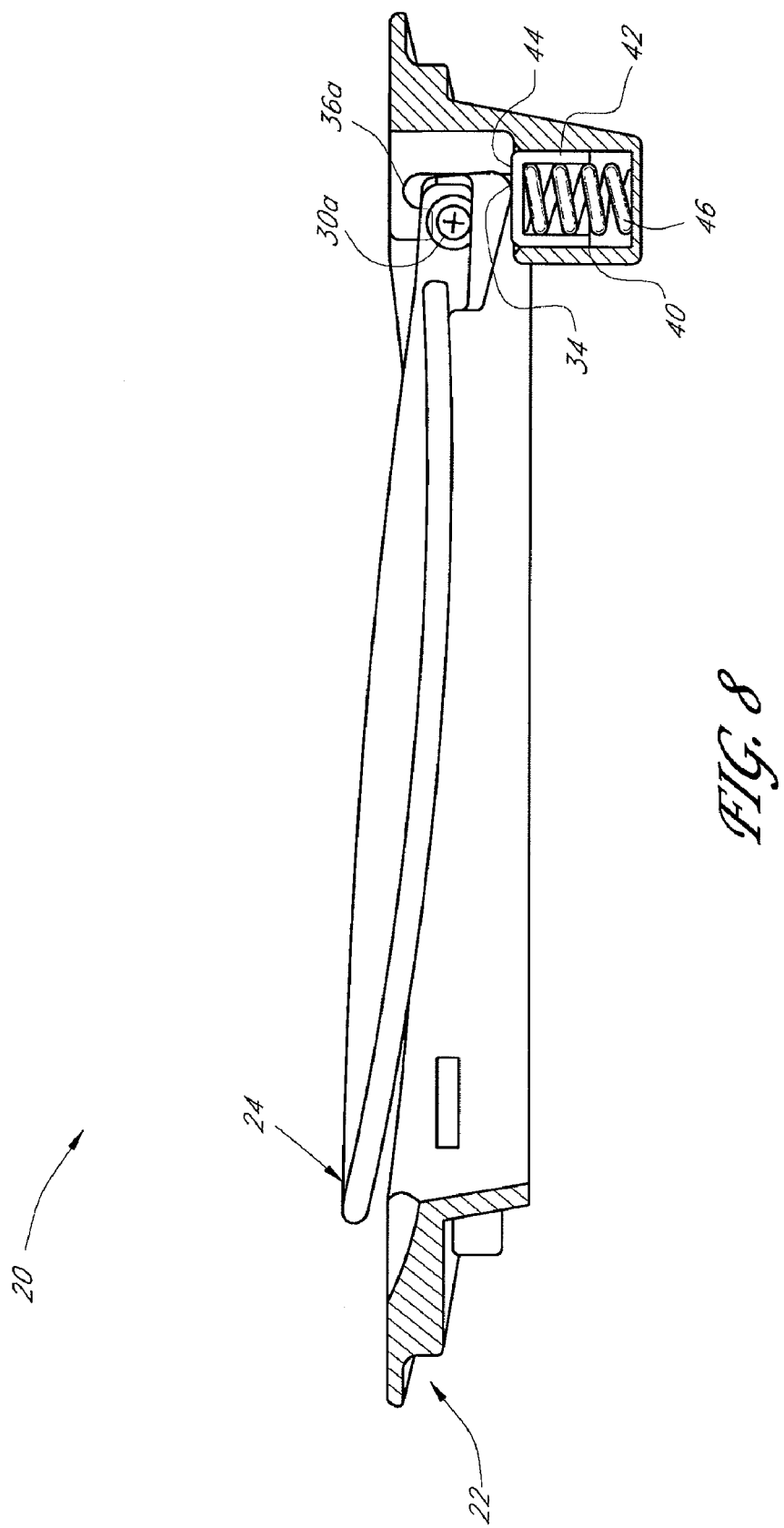
FIG. 8 is a partial sectional view of the fuel door assembly of FIG. 1, shown with the fuel door being assembled to the housing.
Figure 9:
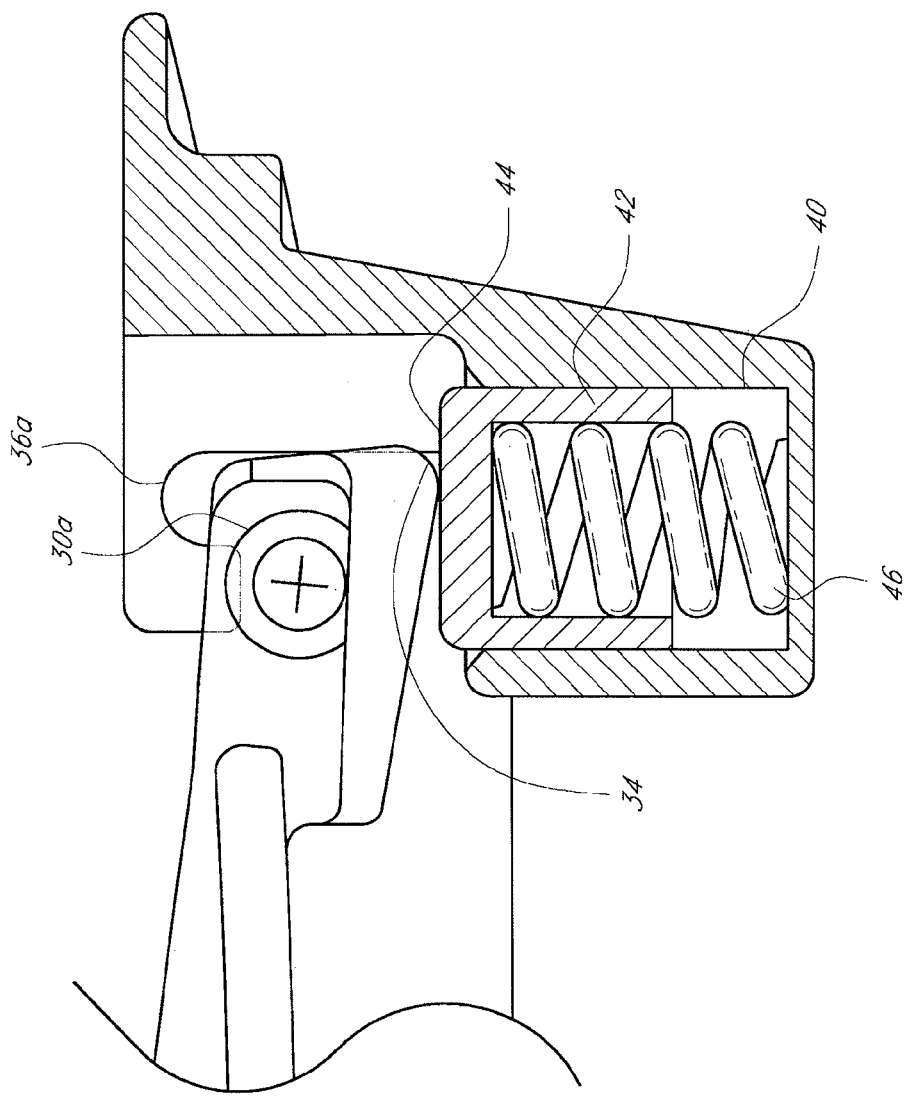
FIG. 9 is an enlarged partial sectional view of the fuel door assembly of FIG. 1, shown with the fuel door being assembled to the housing.

FIGS. 8 and 9 show in greater detail the process of assembling the fuel door 24 to the housing 22. The fuel door is positioned an angle with respect to the closed position A and the peak surface 34 is pressed against the retaining surface 44 of the plunger 42. This forces the plunger 42 downward within the plunger socket 40 until sufficient clearance exists between the plunger 42 and the inward ends of the hinge bearings 36a, 36b to permit the first and second axle portions 30a, 30b to be inserted there between. Once the axle portions 30a, 30b and hinge bearings 36a, 36b are aligned, the outwardly-biased plunger 42 forces the fuel door 24 into its assembled position and maintains the axle portions and hinge bearings in a fixed, but rotatable, relationship.

Thus the fuel door assembly 20 facilitates an assembly process that can be completed without need for tools, fasteners, or highly skilled labor. The small number of parts and the lack of tools or fasteners permits the door installation to be completed quickly and easily. The end result is a sturdy, reliable, and inexpensive fuel door assembly.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

EMBODIMENT OF FIGS. 10-19

Below is a detailed description of the embodiment described in FIGS. 10-19

FIGS. 10-19 depict a fuel door assembly 200 having features in accordance with one preferred embodiment of the invention. The fuel door assembly 200 generally comprises a housing 220 that receives a fuel door 240, which is rotatable through about 80 degrees-100 degrees between a closed position A in which the fuel door is generally flush with the housing (see FIG. 18) and an open position B in which the fuel door permits the entry of a nozzle through an opening in the housing (see FIG. 11). Preferably, the angle between the open position and the closed position is about 90 degrees to 95 degrees (see FIG. 17). It is to be appreciated that the housing 220 can be formed as an integral part of motor vehicle/power equipment exterior panel or fueling pipe.

Figure 10:
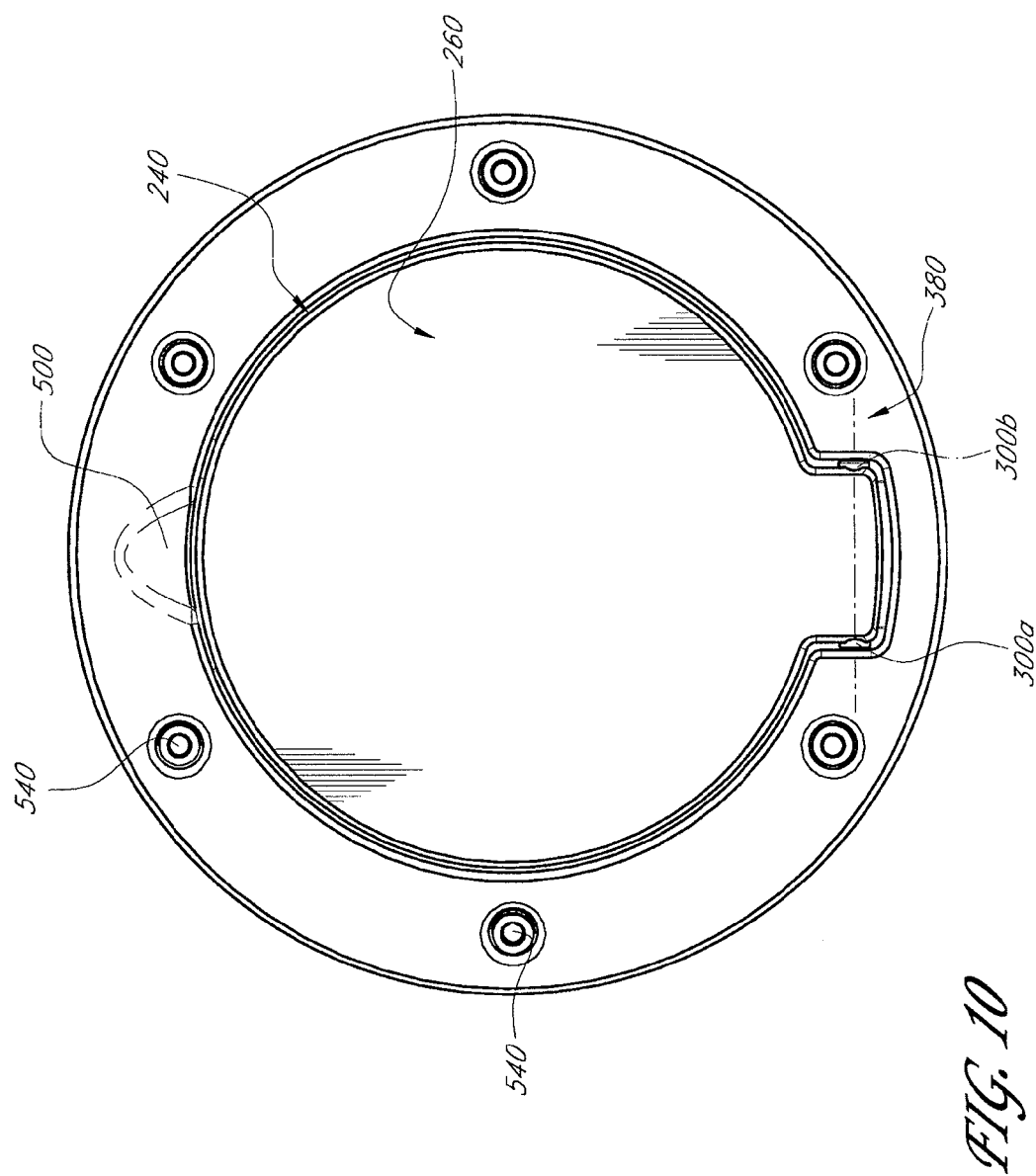
FIG. 10 is a plan view of a fuel door assembly having features in accordance with one preferred embodiment of the invention, shown with the fuel door in the closed position.
Figure 12:
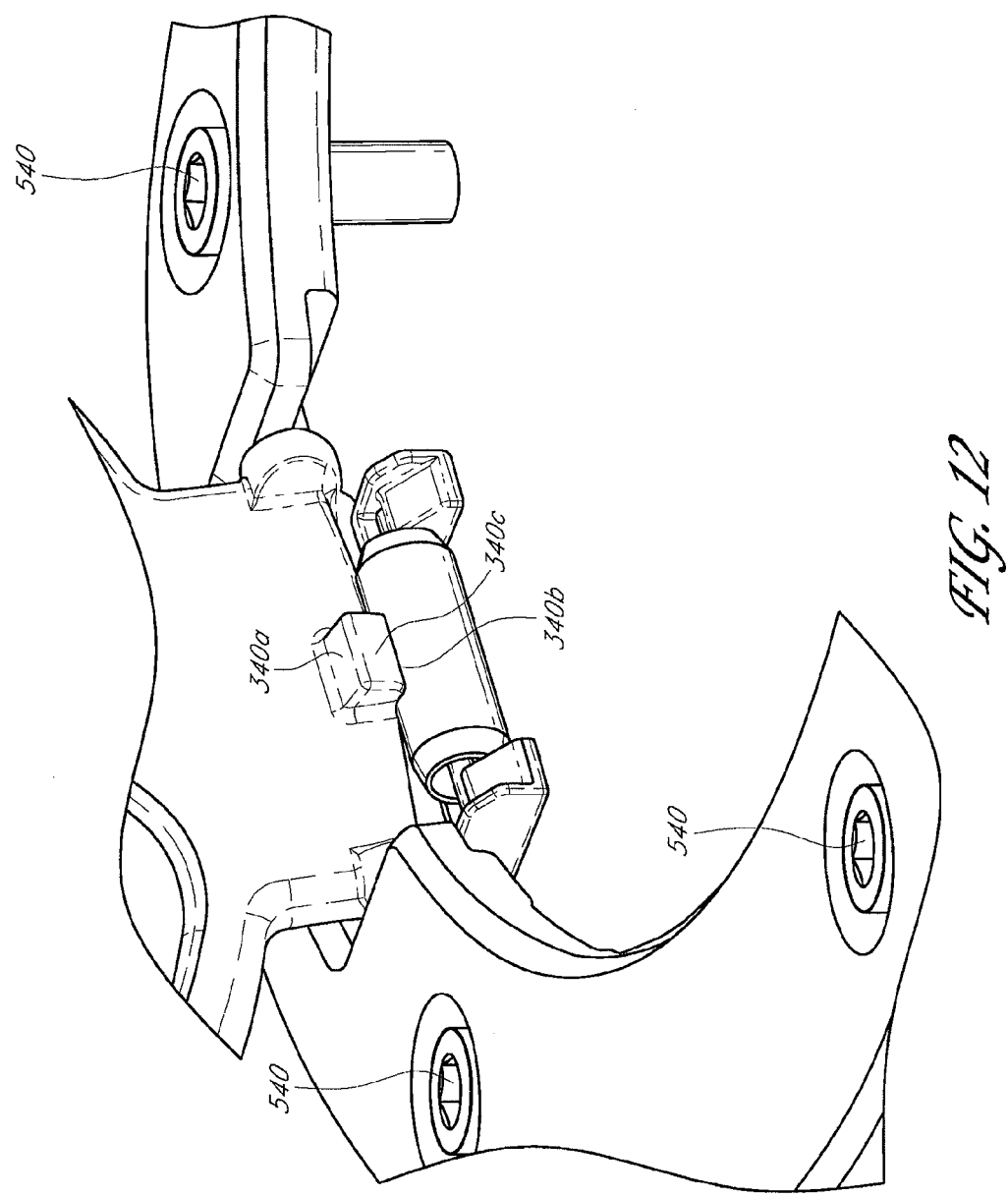
FIG. 12 is an enlarged perspective view of the fuel door assembly of FIG. 10, shown with the fuel door in the opened position.
Figure 17:
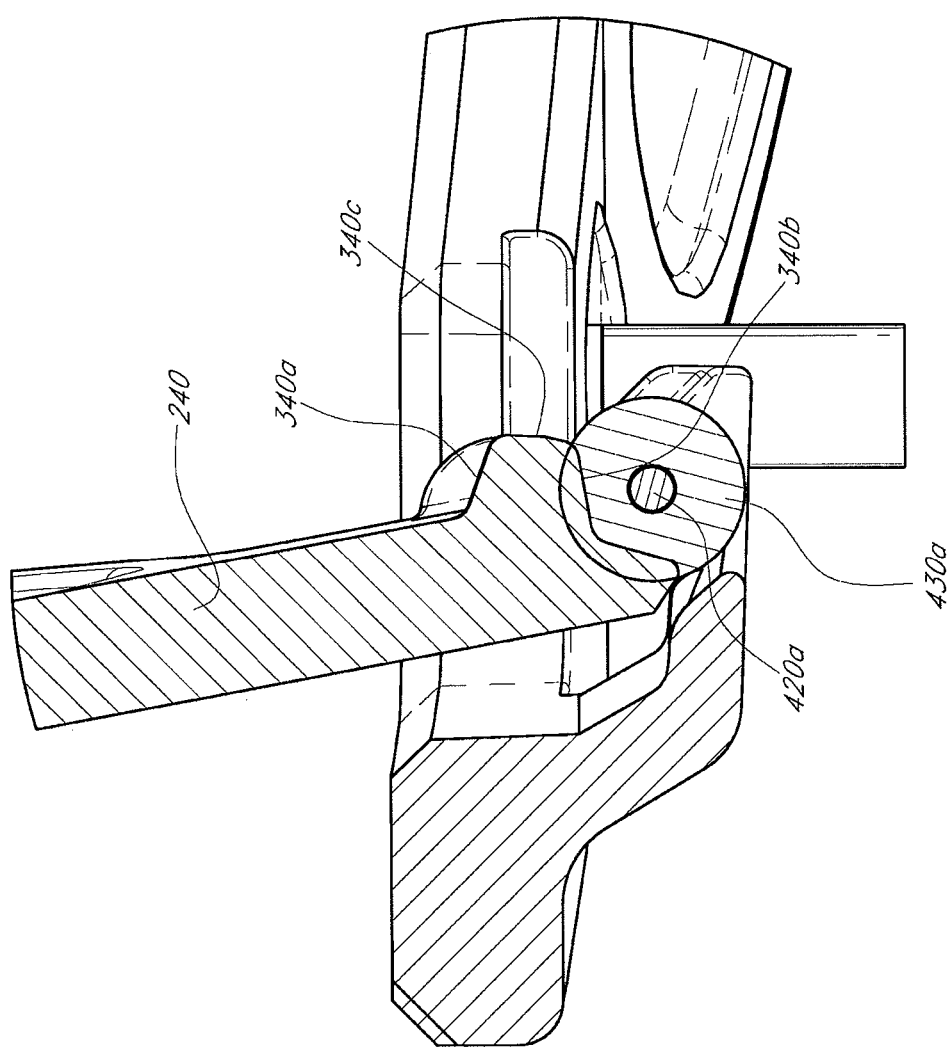
FIG. 17 is a partial sectional view of the fuel door assembly of FIG. 10, shown with the fuel door in the opened position.

The fuel door 240 and the housing 220 are shown in greater detail in FIGS. 10 and 12. The fuel door 240 has a cover portion 260 and hinge portions 300a, 300b. In one embodiment, referring to FIG. 10, the fuel door 240 and the hinge portions 300a, 300b are integrally formed. Referring to FIGS. 12 and 17, the fuel door 240 has a first interface 340 with a first portion 340a and second portion 340b forming a continuous surface. A peak surface 340c, which is preferably curved and/or smoothed, is disposed between the first and second portions 340a, 340b. In one embodiment, the first portion 340a and the second portion 340b and the peak surface 340c form a continuous surface. To minimize cost and difficulty of assembly, the fuel door 240 is preferably formed or molded as an integral unit; however one skilled in the art will appreciate that any of the cover portion 260 and hinge portions 300a, 300b may be separately fabricated and attached to the remainder of the fuel door 240 via conventional techniques.

Figure 14:
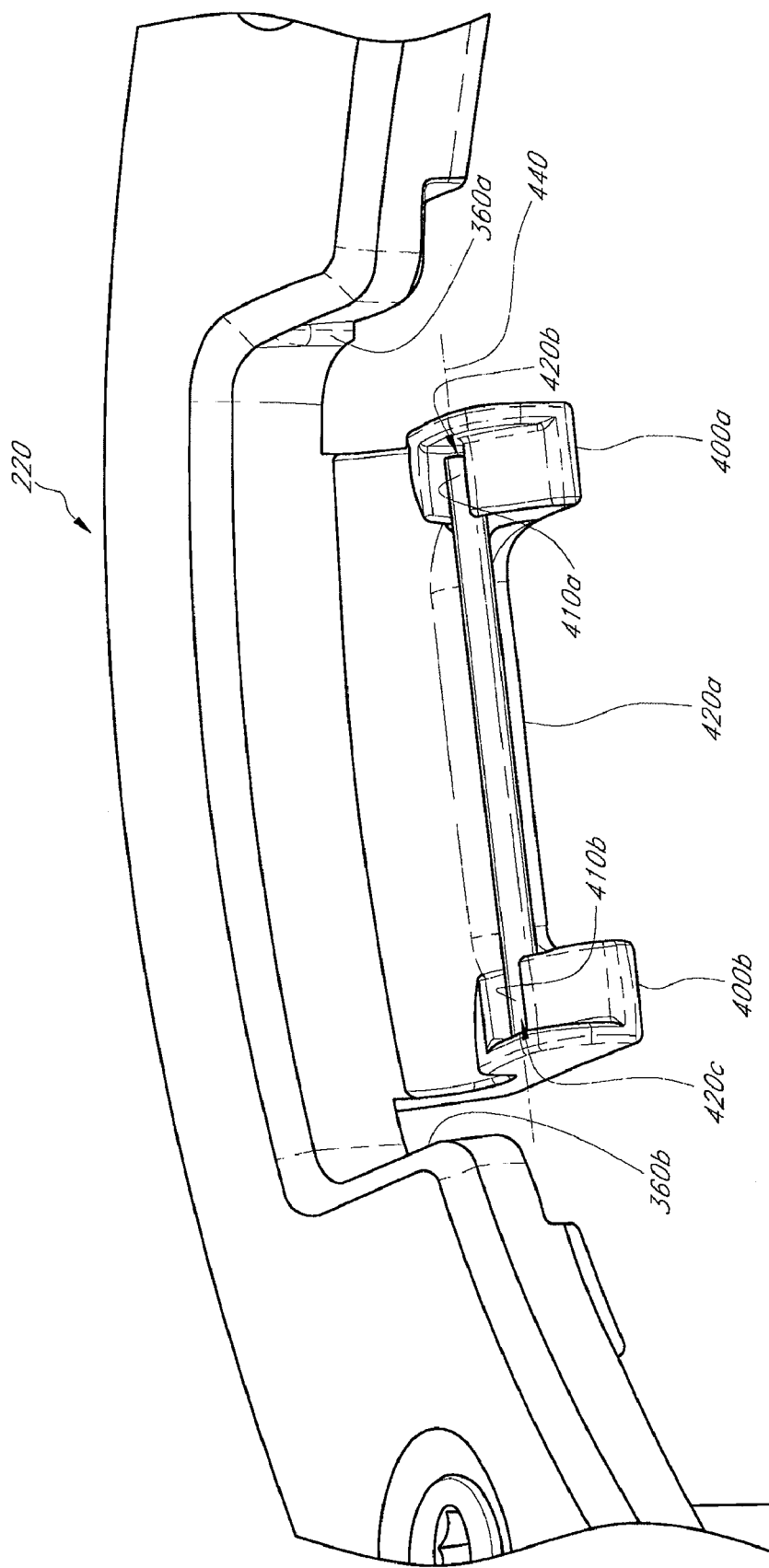
FIG. 14 is an enlarged perspective view of a housing of the fuel door assembly shown in FIG. 10 with a biasing element.
Figure 15:
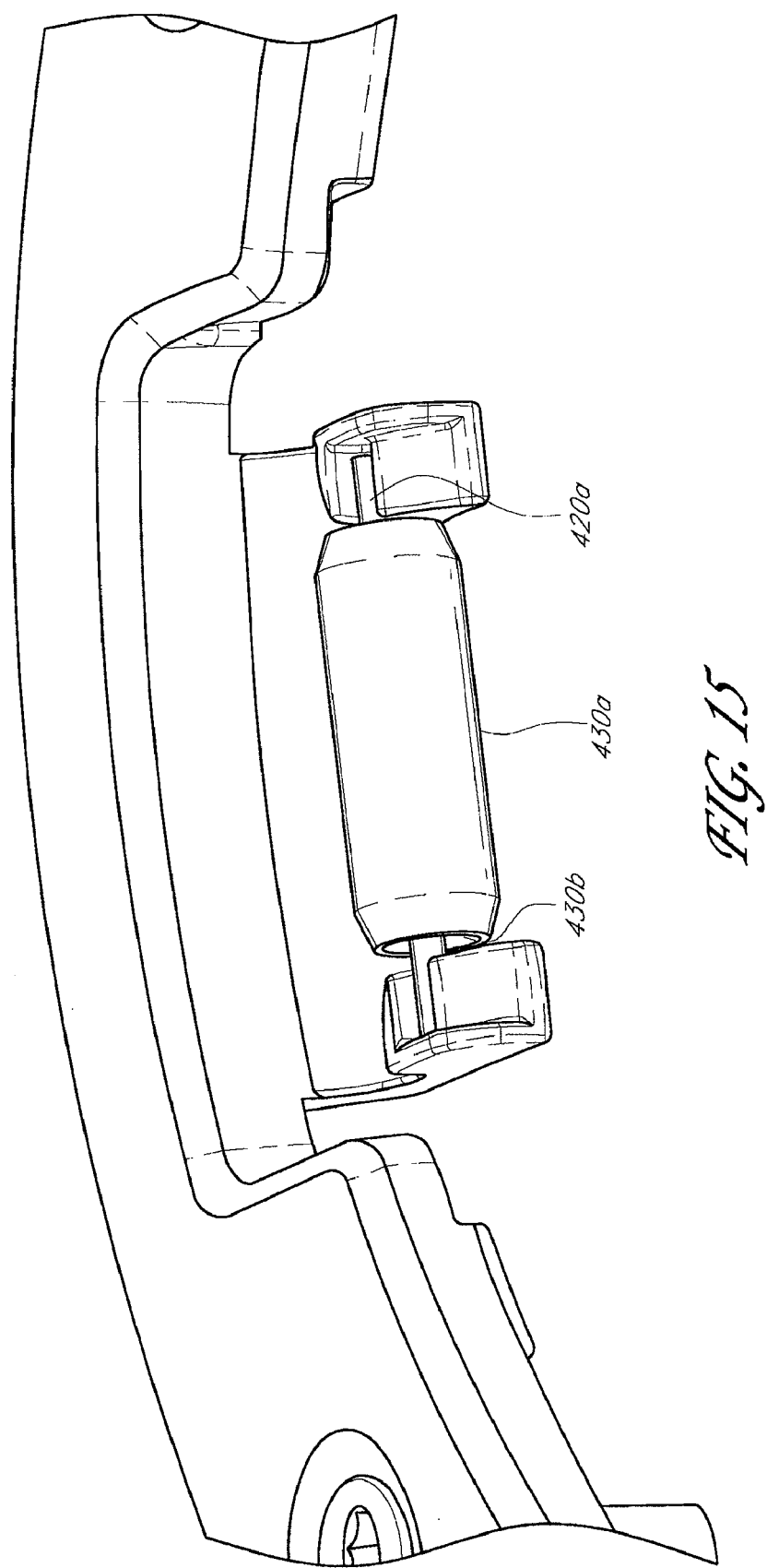
FIG. 15 is an enlarged perspective view of a housing of the fuel door assembly shown in FIG. 10 with a biasing element and a second interface.

Referring specifically to FIG. 14, the housing 220 preferably forms a first hinge bearing surface 360a and a second hinge bearing surface 360b that are axially aligned so as to define an axis of rotation 380 (FIG. 10). In the assembled unit (see FIGS. 10, 11, 12, 14 and 16) the hinge bearings 360a, 360b receive the hinge portions 300a, 300b to permit the fuel door 240 to rotate about the axis of rotation 380. Although this is the preferred configuration, alternative possibilities exist for rotatably connecting the fuel door 240 to the housing 220, such as a single, extended-width hinge bearing that cooperates with a matching single, extended-width axle formed by the fuel door 240.

As best seen in FIG. 14, the hinge bearings 360a, 360b each have an open end that faces inward, i.e. away from the outer side of the housing 220. Between the hinge bearings 360a, 360b, the housing 220 preferably forms first support portion 400a and a second support portion 400b with outward-facing openings 410a, 410b. In one embodiment, first and second support portions 400a and 400b are positioned towards the inner annular opening of the housing 220. In one embodiment, the hinge portions 300a, 300b are positioned on the housing 220 between the first and second support portions 400a, 400b and an outer perimeter of the housing 220.

The outward-facing opening 410a receives a first end 420b of a biasing element 420a and the opening 410b receives second end 420c of the biasing element 420a. With the first and second ends 420b, 420c of the biasing element 420a mounted in the outward-facing openings 410a, 410b, the biasing element 420a defines a longitudinal axis 440 that is substantially parallel to the axis of rotation 380. The first support portion 400a and the second support portion 400b at least partially surround the first and second ends 420b, 420c. In one embodiment, the first and second support portions 400a, 400b surround and secure the first and second ends 420b, 420c with a leaf spring (not shown). Although, it will be apparent to those skilled in the art that alternative securing structures may be used, such as an adhesive or an apex that serves as a retaining surface or other possible securing means. The biasing element 420a comprises a substantially resilient material, such as plastic or metal or the like. In another embodiment, the biasing element 420a comprises a substantially rigid material.

Figure 21:
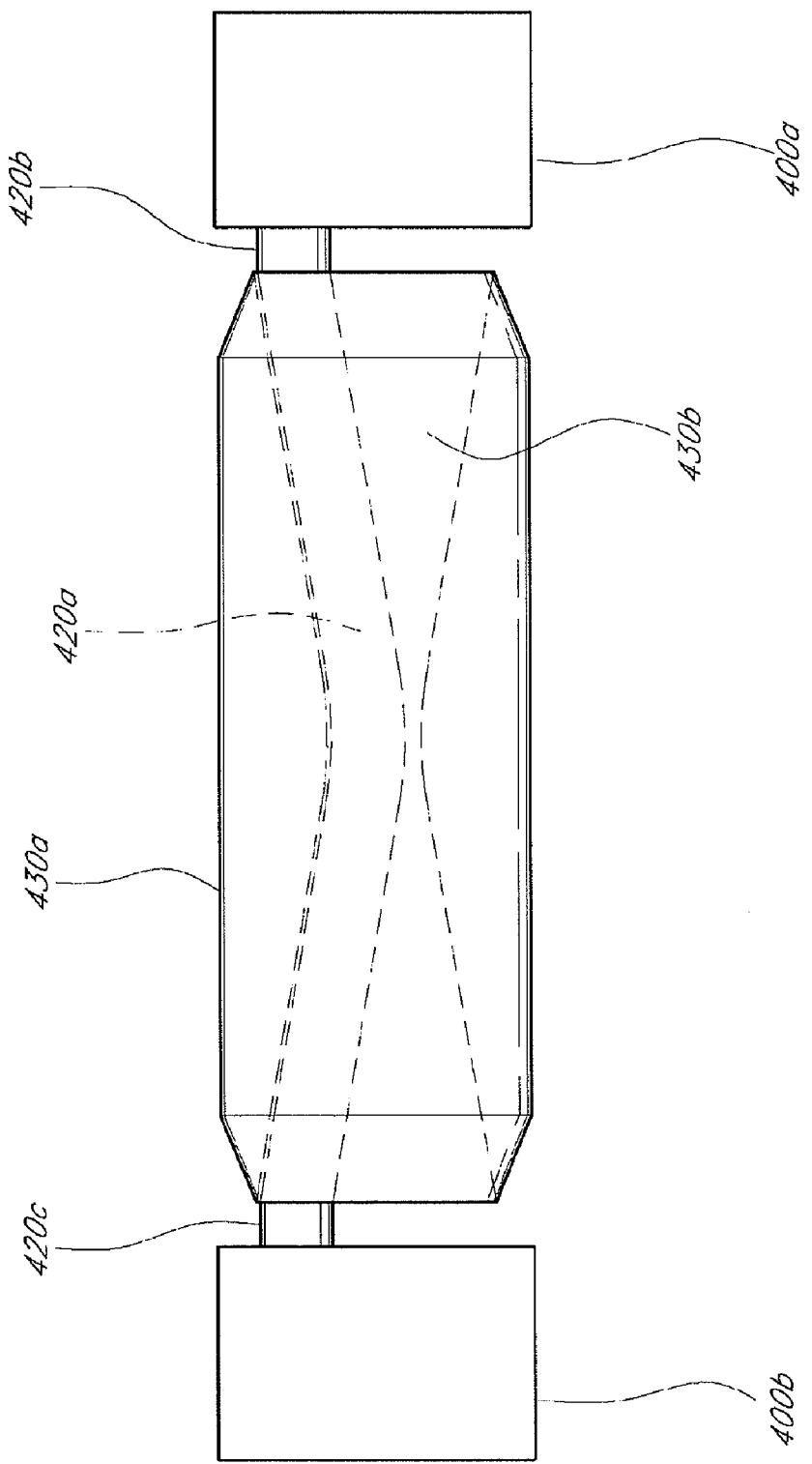
FIG. 21 is a partial sectional view of the second interface and biasing element of FIG. 20 shown in the stressed position.

As best seen in FIGS. 15-20 a second interface 430a at least partially surrounds the biasing element 420a. In one embodiment, the second interface 430a is spaced from the first and second ends 420b, 420c of the biasing element 420a. The second interface 430a defines a cavity 430b that enables the biasing element 420a to flex transversely to the longitudinal axis 440 (see FIG. 21). The cavity 430b narrows between a first end and a second end of the cavity 430b to allow the biasing element 420a to flex transversely to the longitudinal axis 440. In one embodiment, the cavity 430b is substantially curved thereby forming a cavity flared at the ends and narrowed in the middle. The narrowed middle region desirably provides sufficient clearance for insertion of the biasing element 420a through the second interface 430a thereby allowing the biasing element 420a to flex transversely in a plurality of directions so as to curve around the perimeter of cavity 430b. In one embodiment, the cavity 430b is substantially angular thereby forming a pair of conical shapes meeting at their tips. The intersection of the two conical sections desirably provides sufficient clearance for insertion of the biasing element 420a through the second interface 430a thereby allowing the biasing element 420a to flex transversely in a plurality of directions around an angular point. These provisions are advantageous for several reasons. Incorporating biasing element 420a within a second interface 430a allows for a lower profile design that forms a more compact fuel door assembly package. Further, such provisions avoid malfunctions due to corrosion of a metal spring or interference from dirt and debris. Moreover, such provisions allow the biasing element to apply a biasing force on the fuel door from a plurality of directions. Additionally, providing sufficient clearance for insertion of the biasing element 420a through the second interface 430a prevents the biasing element 420a from rattling within the cavity 430b.

In one embodiment, at least a portion of the second interface 430a defines a substantially cylindrical outer surface. In one embodiment, at least a portion of the second interface 430a defines a tube. In one embodiment, the second interface 430a comprises a flexible material that flexes when the flexible material engages the first interface 340. In one embodiment, the second interface 430a comprises a substantially rigid material that does not substantially flex when the rigid material engages the first interface 340. To minimize manufacturing complexity, the second interface 430a and the biasing element 420a are preferably combined from two separate units. It is to be appreciated that the second interface 430a and the biasing element 420a can be formed or molded as an integral unit.

Figure 18:
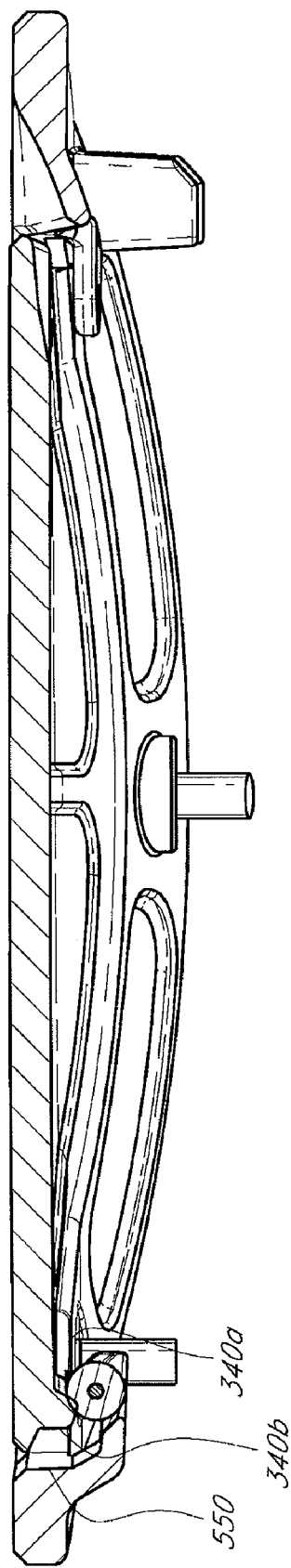
FIG. 18 is a partial sectional view of the fuel door assembly of FIG. 10, shown with the fuel door in the closed position.

As best seen in FIG. 12 and FIG. 18, the biasing element 420a biases the first interface 340 in a first direction to move the fuel door 240 toward a closed position when the first portion 340a is engaged. In one embodiment, the biasing element 420a biases the first interface 340 in a second direction to move the fuel door 240 toward an opened position when the second portion 340b is engaged. In one embodiment, the second interface 430a contacts the first interface 340 to apply a biasing force in the first direction that is substantially towards the hinge portions 300a, 300b. In one embodiment, the second interface 430a contacts the first interface to apply a biasing force in the second direction that is substantially towards an outer face of the housing 220.

Figure 11:
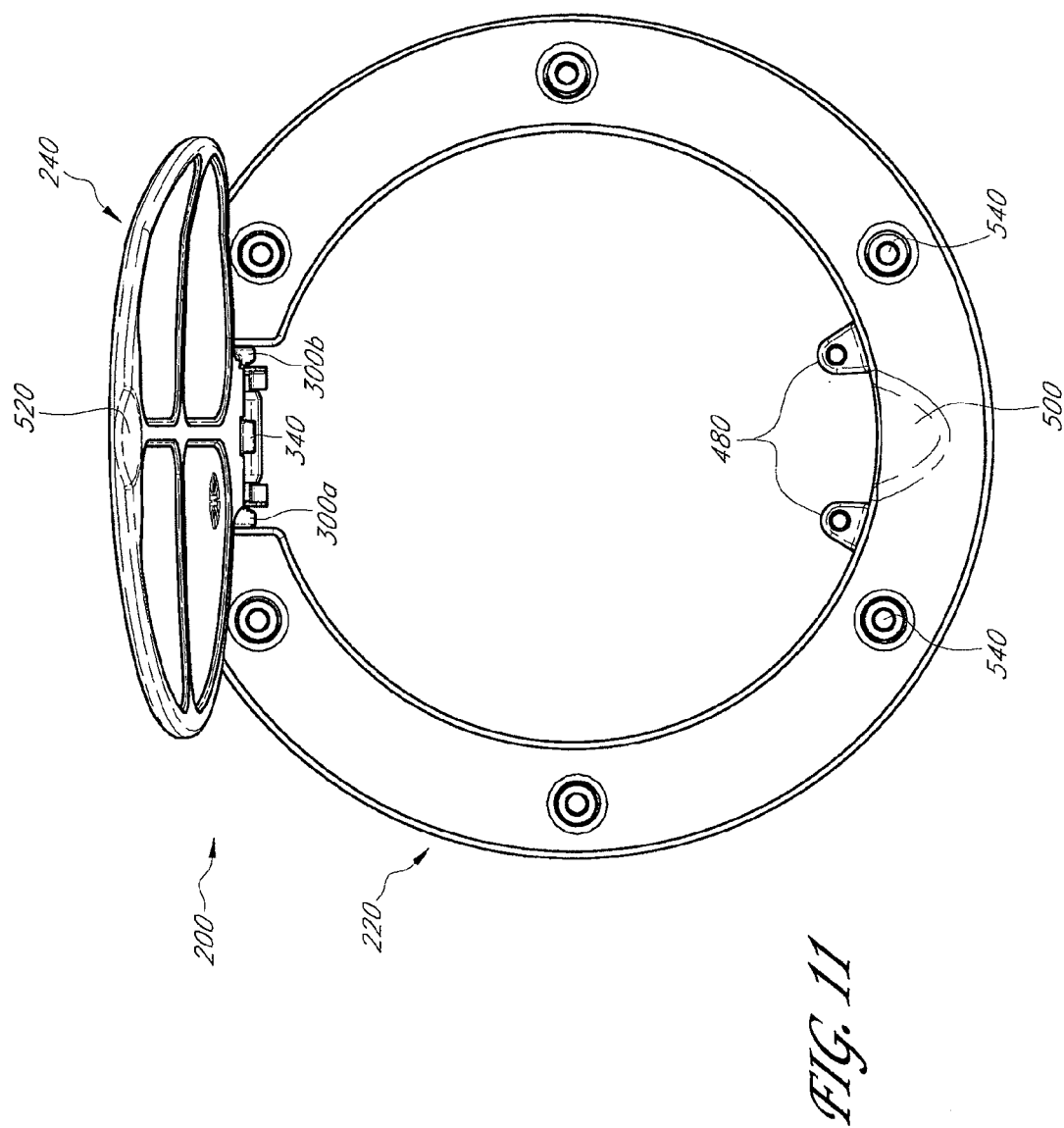
FIG. 11 is a plan view of the fuel door assembly of FIG. 10, shown with the fuel door in the opened position.

With reference to FIGS. 10 and 11 the housing 220 preferably also comprises one or more alignment pads 480 against which the fuel door 240 rests when in the closed position, and a housing cutout 500 that cooperates with a door cutout 520 in the door 240 to facilitate easy grasping of the distal end of the door 240 when in the closed position. A number of openings 540 may also be provided to allow attachment of the fuel door assembly 200 to a motor vehicle or other equipment, with screws or other fasteners known to those skilled in the art. The housing 220 preferably also forms a mechanical stop 550 to limit the range of travel of the fuel door 240 and more precisely define the open position B. In such embodiments, however, a housing 220 could be eliminated entirely. For example, the support portions 400a, 400b could be fastened to the vehicle side panel or be formed integrally therewith.

Figure 16:
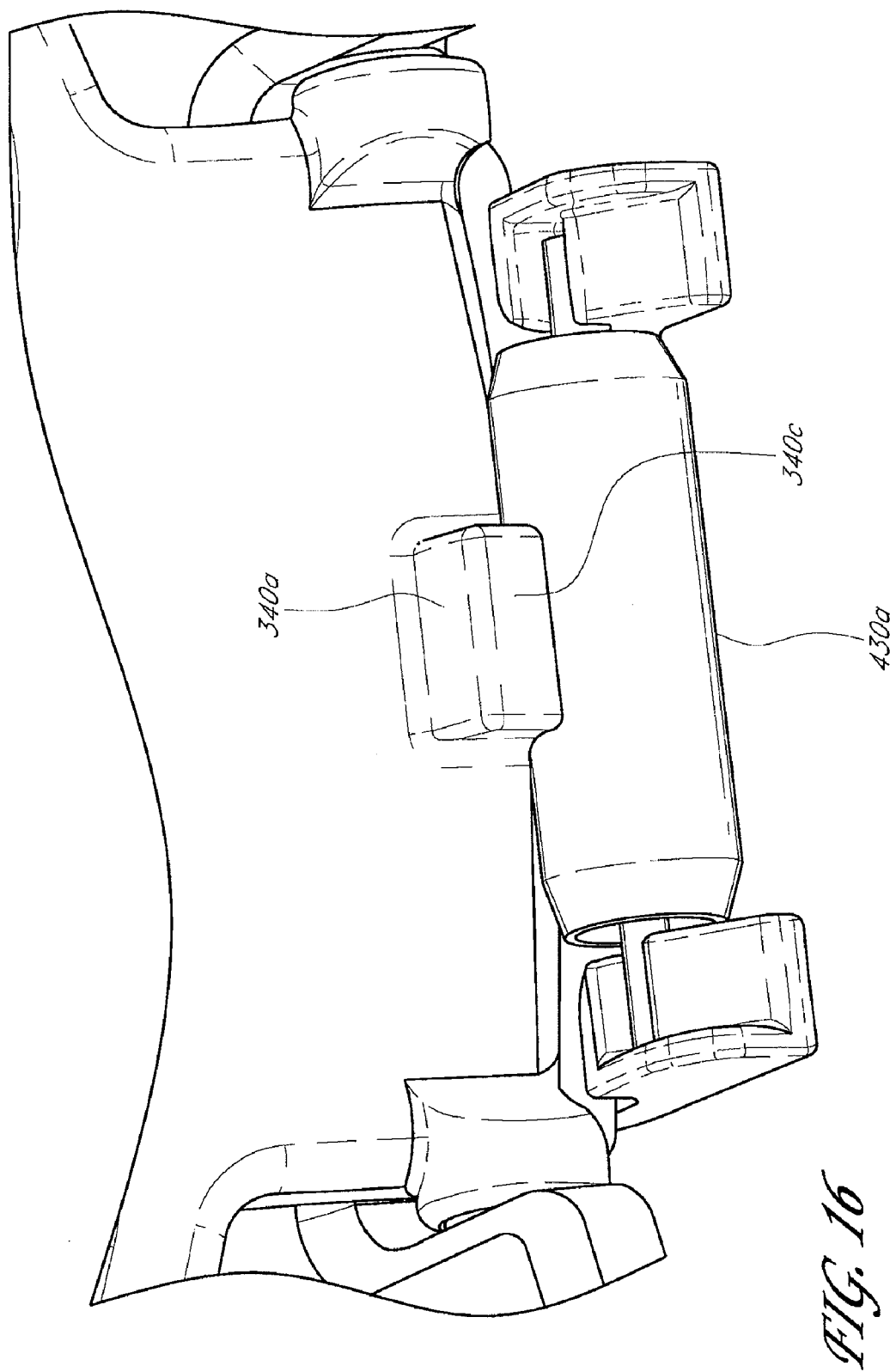
FIG. 16 is an enlarged perspective view of the fuel door assembly shown in FIG. 10.

FIGS. 11 and 16 show the assembled fuel door assembly 200 in detail. When the fuel door 240 is in either the closed position A or the open position B, the second interface 430a bears against the first interface 340 of the fuel door 240 (at either the first portion 340a or the second portion 340b or the peak surface 340c), under the urging of the biasing element 420a. The second interface 430a thus retains the fuel door 240 in assembled relation to the housing 220 by urging the hinge portions 300a, 300b of the fuel door 240 against the first and second hinge bearings 360a, 360b of the housing 220 and retaining the hinge portions therein. In this manner the hinged portions 300a, 300b are journaled to the first and second hinge bearings 360a, 360b and the fuel door 240 is fixed to the housing but nonetheless rotatable about the axis of rotation 380.

Figure 13:
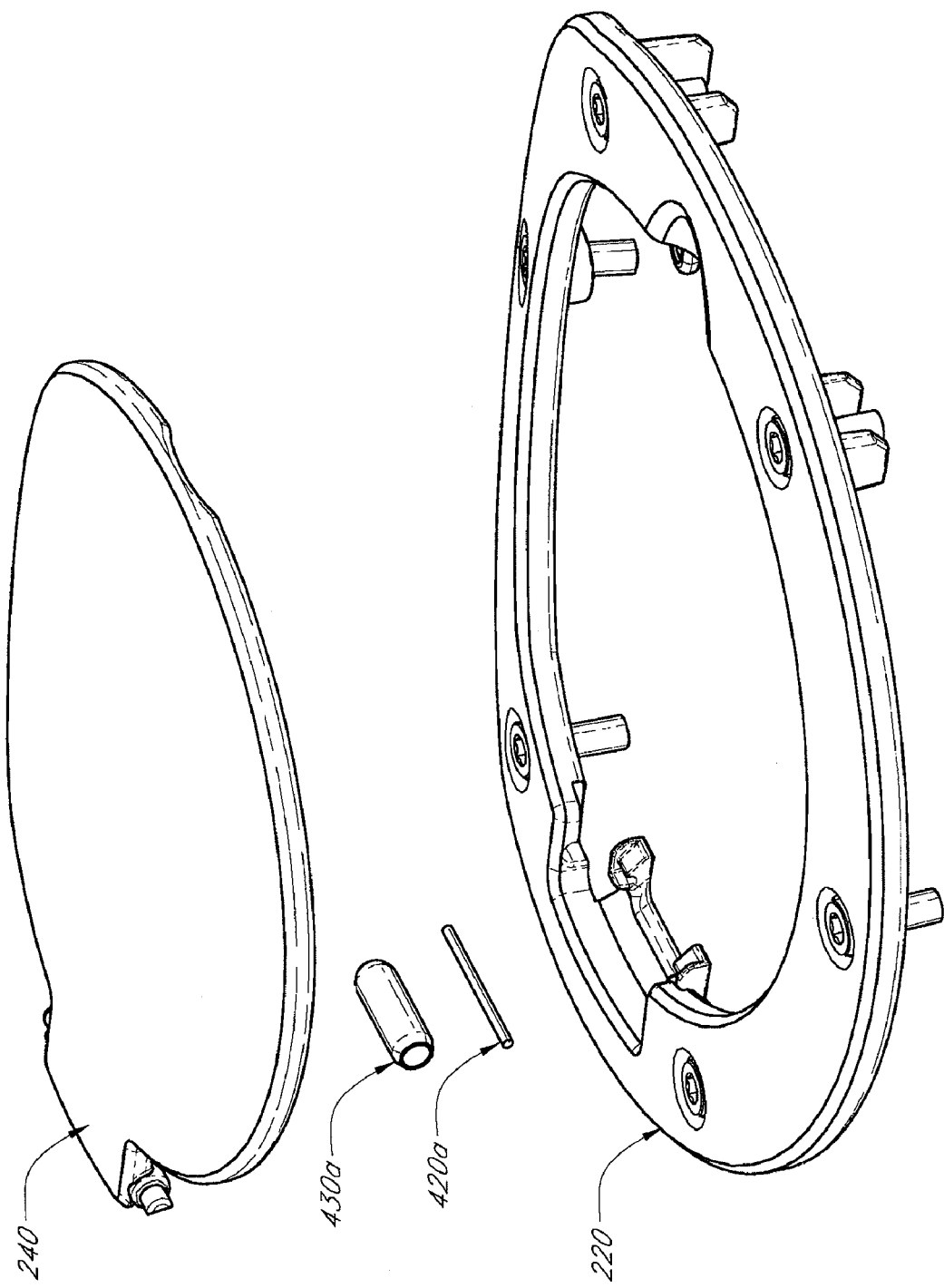
FIG. 13 is a perspective view of the fuel door assembly of FIG. 10, shown with the fuel door detached from the housing assembly.

This arrangement of the biasing element 420a, the second interface 430a, the first interface 340, hinge portions 300a, 300b and hinge bearings 360a, 360b provides many advantages in the construction of the fuel door assembly 200. No tools, fasteners or special skills are needed to assemble the fuel door 240 to the housing 220, which reduces the labor expense incurred in producing the fuel door assembly 220. Referring to FIG. 13, the preferred assembly 200 contains at most four to six parts and is thus sturdy, lightweight, reliable, and no more complex than needed. The assembly process is speeded (and labor expenses reduced) when there are fewer parts that need to be put together, and the logistical "tail" leading to the assembly workstation is greatly simplified when fewer parts need to be supplied, tracked and accounted for. Further, the position of the first and second support portions 400a, 400 b allow the preferred assembly 200 provides a lower profile design that is more compact and does not protrude far into the exterior panel of a motor vehicle or power equipment. Further, the use of biasing element 420a and second interface 430a, both preferably comprising a plastic material, avoids malfunctioning of the assembly due to corrosion of the biasing element.

Figure 19:
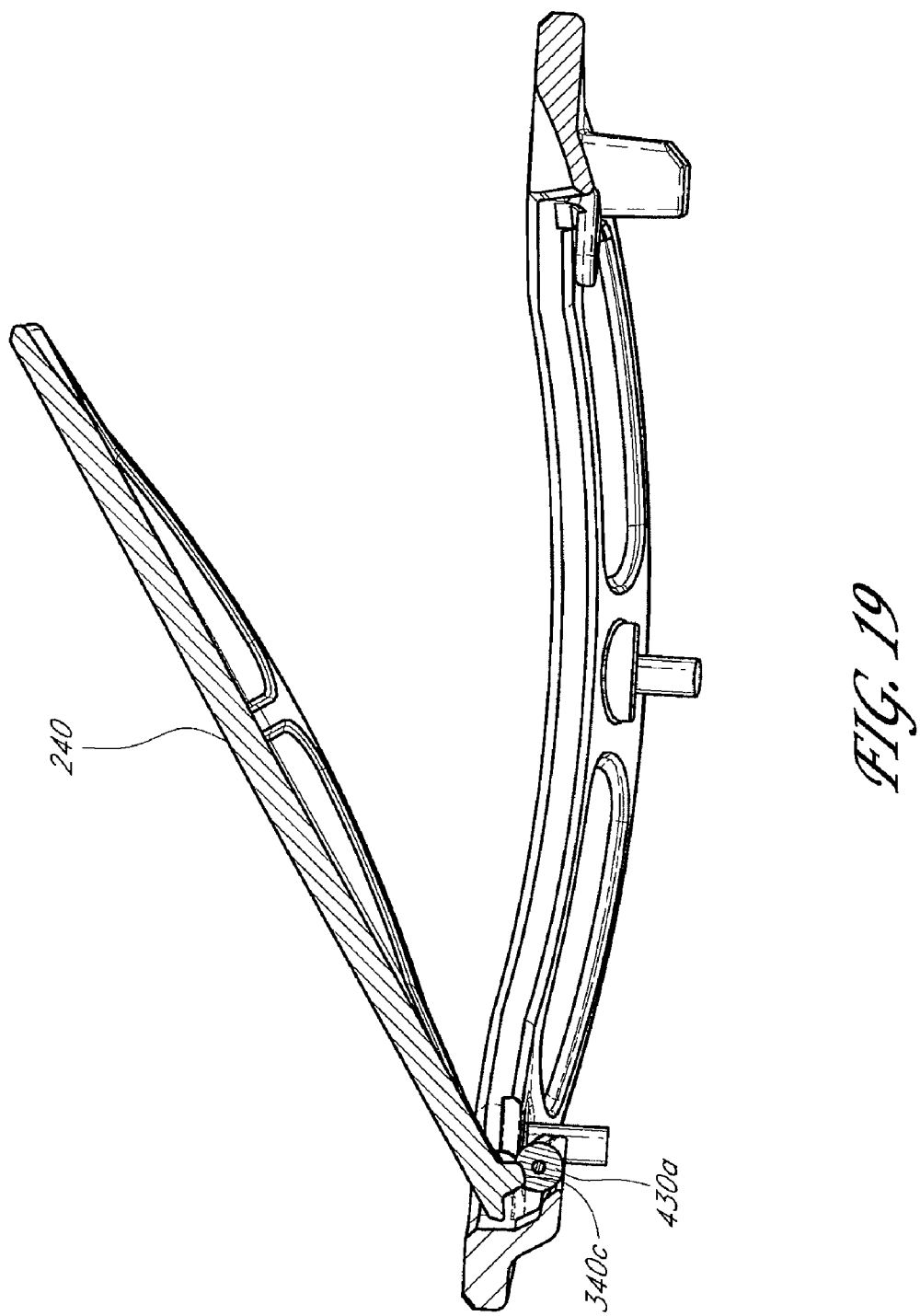
FIG. 19 is a partial sectional view of the fuel door assembly of FIG. 10, shown with the fuel door in the partially closed and partially opened position.
Figure 20:
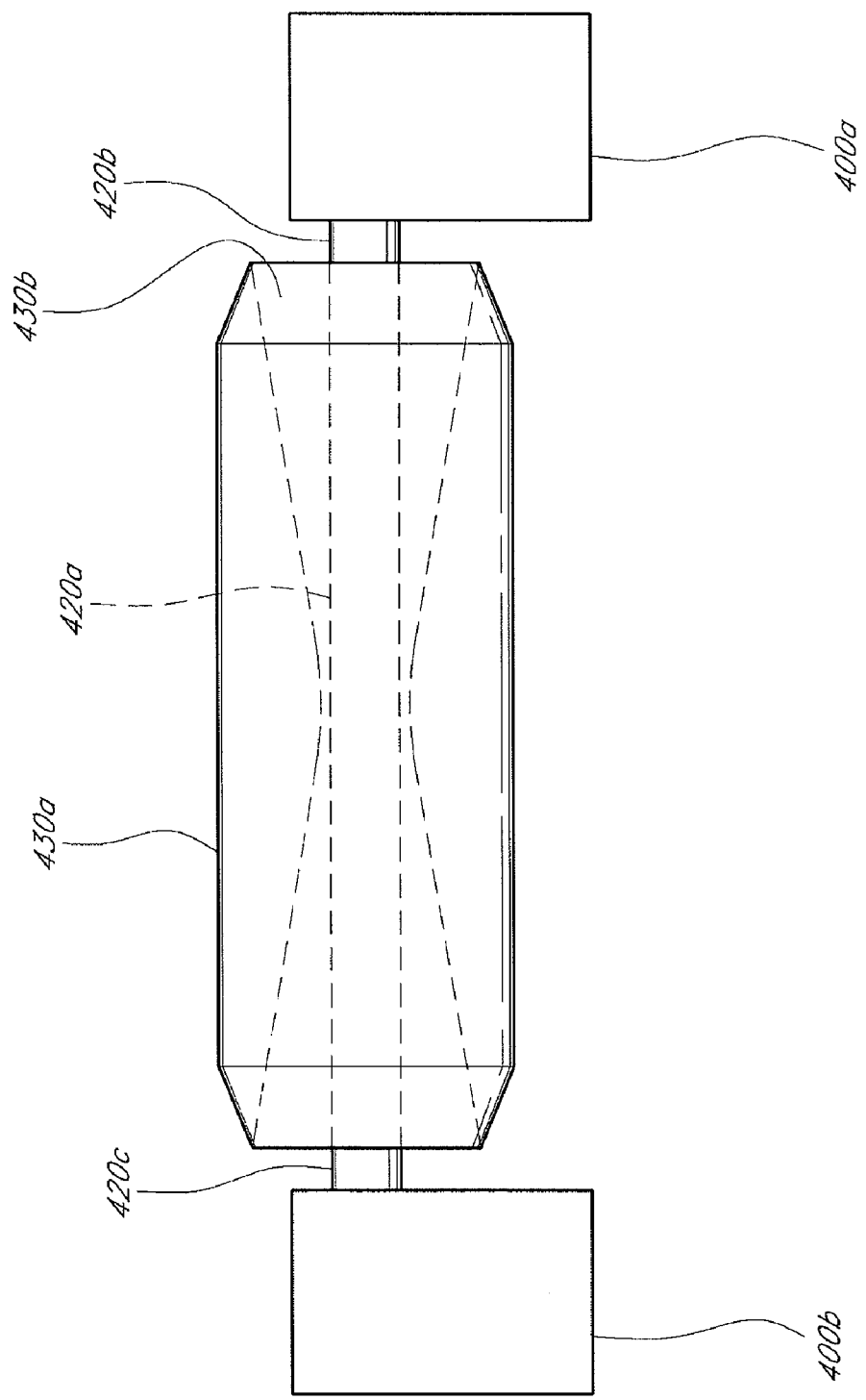
FIG. 20 is a partial sectional view of the fuel door assembly of FIG. 10, shown with a second interface defining a cavity for a biasing element to flex transversely to a longitudinal axis.

At the closed position A shown in FIG. 18 the second interface 430a contacts and bears against the first portion 340a such that the second interface 430a is not flush with the first portion 340a. Thus when the fuel door 240 is at or near the closed position A, the second interface 430a urges the fuel door 240 toward the closed position A. Similarly, when the fuel door 240 is at or near the open position B, as seen in FIG. 12, the second interface 430a contacts and bears against the second portion 340b of the first interface 340. Thus when the fuel door 240 is at or near the open position B the second interface 430a urges the fuel door 240 toward the open position B. In this manner a "closed-bias" or "open-bias" force is constantly applied to the fuel door 240 at the closed position A and the open position B, respectively, as the second interface 430a and the first interface 340 co-act to hold the fuel door closed or open at either position. Referring to FIG. 19, when the fuel door is in a middle position between the closed position A and the open position B, the second interface 430a contacts and bears against peak surface 340c such that the fuel door 340 is neither urged toward the closed position A or the open position B.

This provision of a closed-bias/open-bias force in the closed and/or open positions A, B is advantageous for several reasons. When closed, the fuel door 240 is less likely to fall open except when the user deliberately grasps it and pulls it open. Thus, the fuel door 240 will not open "by itself" or clatter against the housing 220 when encountering vibration and/or aerodynamic forces when the vehicle (or other equipment) is underway. When open, the fuel door 240 is firmly retained at the (precisely defined) open position B and the fuel door assembly 200 thus conveys to the user the "feel" of a precision-crafted product, which is especially important to owners or potential purchasers of high performance or luxury automobiles. The precision of the open position B can be further enhanced by the inclusion in the housing of the mechanical stop 550 (see FIG. 18). Alternatively, the door assembly can bias the fuel door 240 toward an open or closed position but not all the way to the open or closed position, so that the final opening or closing of the fuel door assembly is performed manually.

Thus the fuel door assembly 200 desirably facilitates an assembly process that can be completed without need for tools, fasteners, or highly skilled labor. The small number of parts and the lack of tools or fasteners permits the door installation to be completed quickly and easily. The end result is a sturdy, reliable, and inexpensive fuel door assembly.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A fuel door assembly, comprising:
   a first support portion;
   a second support portion;
   a biasing element having a first end mounted to said first support portion and a second end mounted to said second support portion;
   a fuel door;
   a first hinge portion connected to said fuel door defining an axis of rotation, said fuel door and said first hinge portion being integrally formed;
   a first interface connected to said fuel door; said biasing element biasing said first interface in a first direction to move said fuel door toward a closed position and said biasing element biasing said first interface in a second direction to move said fuel door toward an open position; and
   a housing, wherein said first hinge is portion positioned on said housing between said first and second support portions and an outer perimeter of said housing, wherein said first direction is substantially towards said first hinge portion, and wherein said second direction is substantially towards an outer face of said housing.

2. The fuel door assembly defined in claim 1, further comprising a second interface at least partially surrounding said biasing element between said first end and said second end.

3. The fuel door assembly defined in claim 2, said second interface spaced from said first end and said second end of said biasing element.

4. The fuel door assembly defined in claim 1, said first interface defining a first portion and a second portion.

5. The fuel door assembly defined in claim 4, said first portion and said second portion forming a continuous surface.

6. A fuel door assembly, comprising:
   a first support portion;
   a second support portion;
   a biasing element defining a longitudinal axis having a first end mounted to said first support portion and a second end mounted to said second support portion;
   a fuel door;
   a first hinge portion connected to said fuel door defining an axis of rotation, said longitudinal axis aligned with said axis of rotation, wherein said longitudinal axis is substantially parallel to said axis of rotation;
   a first interface connected to said fuel door; said biasing element biasing said first interface to move said fuel door toward a closed position and said biasing element biasing said first interface to move said fuel door toward an open position; and
   a second interface at least partially surrounding said biasing element between said first end and said second end; said second interface defining a cavity enabling said biasing element to flex transversely to the longitudinal axis; said cavity of said second interface narrowing between said ends.

7. The fuel door assembly defined in claim 6, said biasing element comprises a substantially resilient material.

8. The fuel door assembly defined in claim 6, at least a portion of said second interface defining a substantially cylindrical outer surface.

9. The fuel door assembly defined in claim 6, said second interface defining a tube.

10. The fuel door assembly defined in claim 6, said second interface comprises a substantially rigid material.

* * * * *